(12) United States Patent
Hylen

(10) Patent No.: US 6,201,933 B1
(45) Date of Patent: Mar. 13, 2001

(54) IMAGE MODIFIERS FOR USE IN PHOTOGRAPHY

(75) Inventor: Steven H. L. Hylen, New Milford, CT (US)

(73) Assignee: Smartlens Corporation, Atlanta, GA (US)

( * ) Notice: Subject to any disclaimer, the term of this patent is extended or adjusted under 35 U.S.C. 154(b) by 0 days.

(21) Appl. No.: 09/187,772

(22) Filed: Nov. 6, 1998

Related U.S. Application Data

(63) Continuation-in-part of application No. PCT/US97/08605, filed on May 9, 1997, which is a continuation-in-part of application No. 08/526,990, filed on Sep. 12, 1995, now Pat. No. 5,649,259.

(51) Int. Cl.[7] ............................. G03B 17/24; G03B 11/00
(52) U.S. Cl. ............................................. 396/316; 396/544
(58) Field of Search ..................................... 396/314–316, 396/322, 327, 330, 337, 544, 340, 73; 355/71; 352/43, 45, 48; 359/889

(56) References Cited

U.S. PATENT DOCUMENTS

| | | | |
|---|---|---|---|
| 1,396,035 | * 11/1921 | Gaisman | 396/316 |
| 3,665,828 | * 5/1972 | Reiter | 396/340 |
| 3,916,423 | * 10/1975 | Ueda et al. | 396/316 |
| 3,950,769 | * 4/1976 | Yevick | 396/327 |
| 4,304,471 | 12/1981 | Jones . | |
| 4,342,510 | * 8/1982 | Guillaume | 396/511 |
| 4,533,224 | * 8/1985 | Ou | 396/322 |
| 4,842,396 | 6/1989 | Minoura et al. . | |
| 4,937,609 | * 6/1990 | Wakabayashi et al. | 396/73 |
| 5,038,161 | 8/1991 | Ki . | |
| 5,164,765 | * 11/1992 | Strobel et al. | 355/71 |
| 5,247,320 | * 9/1993 | Kay | 396/316 |
| 5,550,610 | * 8/1996 | DeMarco | 396/544 |
| 5,649,259 | * 7/1997 | Hylen | 396/316 |

* cited by examiner

Primary Examiner—D. Rutledge
(74) Attorney, Agent, or Firm—Darby & Darby

(57) ABSTRACT

In a first embodiment of the invention, a transparent plate is mounted at the film plane within a camera. The transparent plate includes a translucent diffusion pattern which diffuses incoming light rays reflected from the subject and effectively repositions them in a controlled manner prior to the light exposing the film. Proposed diffusion patterns may alter the light rays to create characteristics indicative of various types of paintings.

In another embodiment of the invention, the transparent plate is mounted in a film cartridge.

In another embodiment of the invention, a length of plastic film (a pattern strip) is positioned adjacent to a similar length of photographic film (film strip). An appropriate translucent diffusion pattern is provided onto one surface of the pattern strip, along its entire length. Both strips are rolled into a conventional 35 mm film canister and dispensed simultaneously, as needed (within the camera) so that each frame of film has a separate mask in front of it, at the film gate of the camera.

In another embodiment of the invention, a transparent plate having a translucent diffusion pattern is positioned between the main lens of the camera, and the camera body. In this arrangement, a correcting lens is required to bring the pattern of the particular pattern into sharp focus with the image at the film plane to be exposed on film.

7 Claims, 30 Drawing Sheets

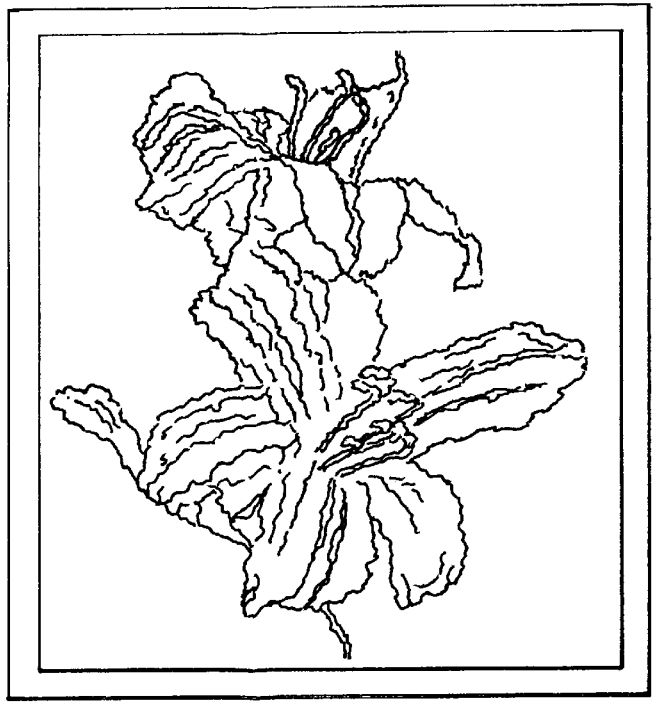
FIG. 24
FIG. 25

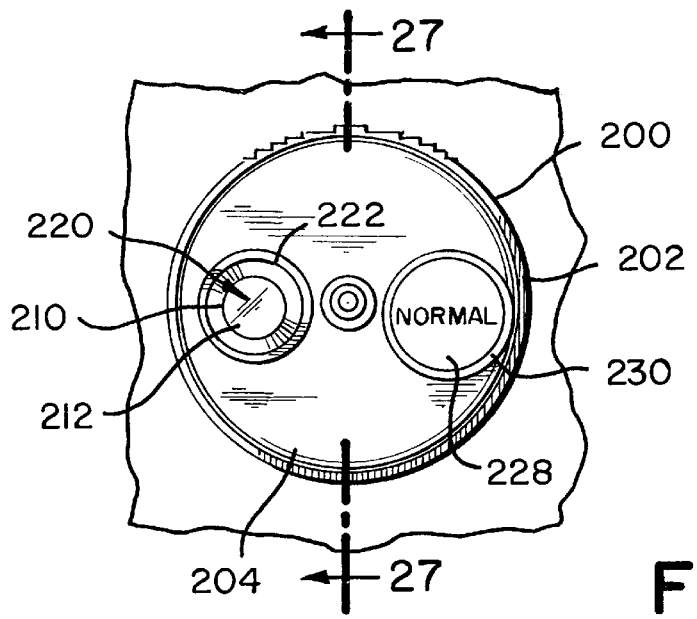
FIG. 26
FIG. 27
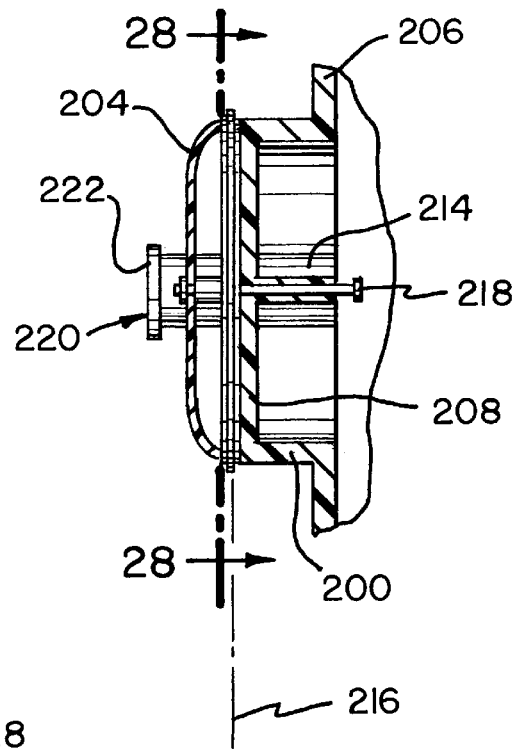
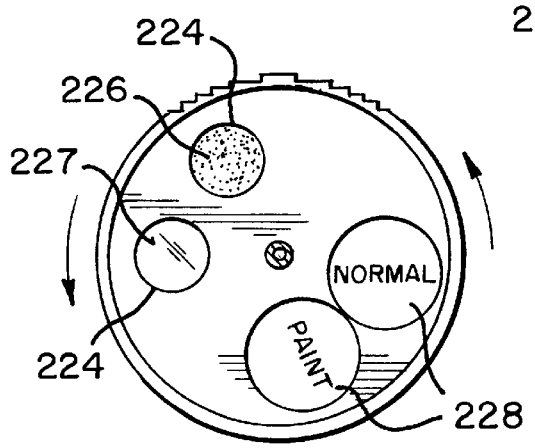
FIG. 28

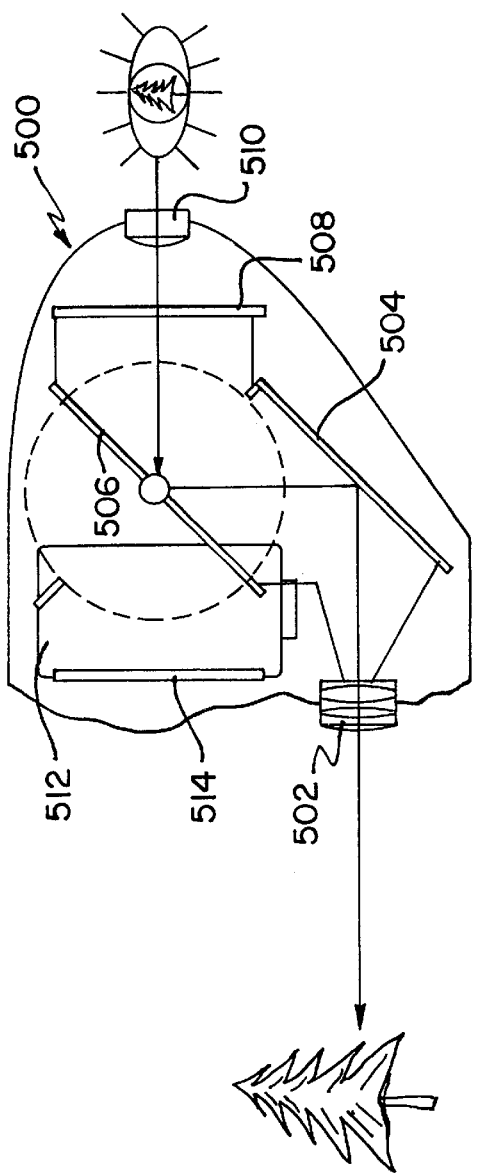
FIG. 33a
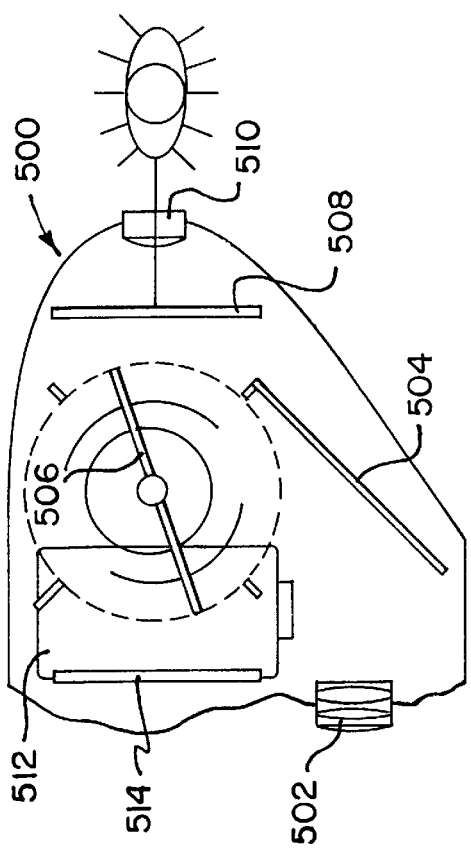
FIG. 33b

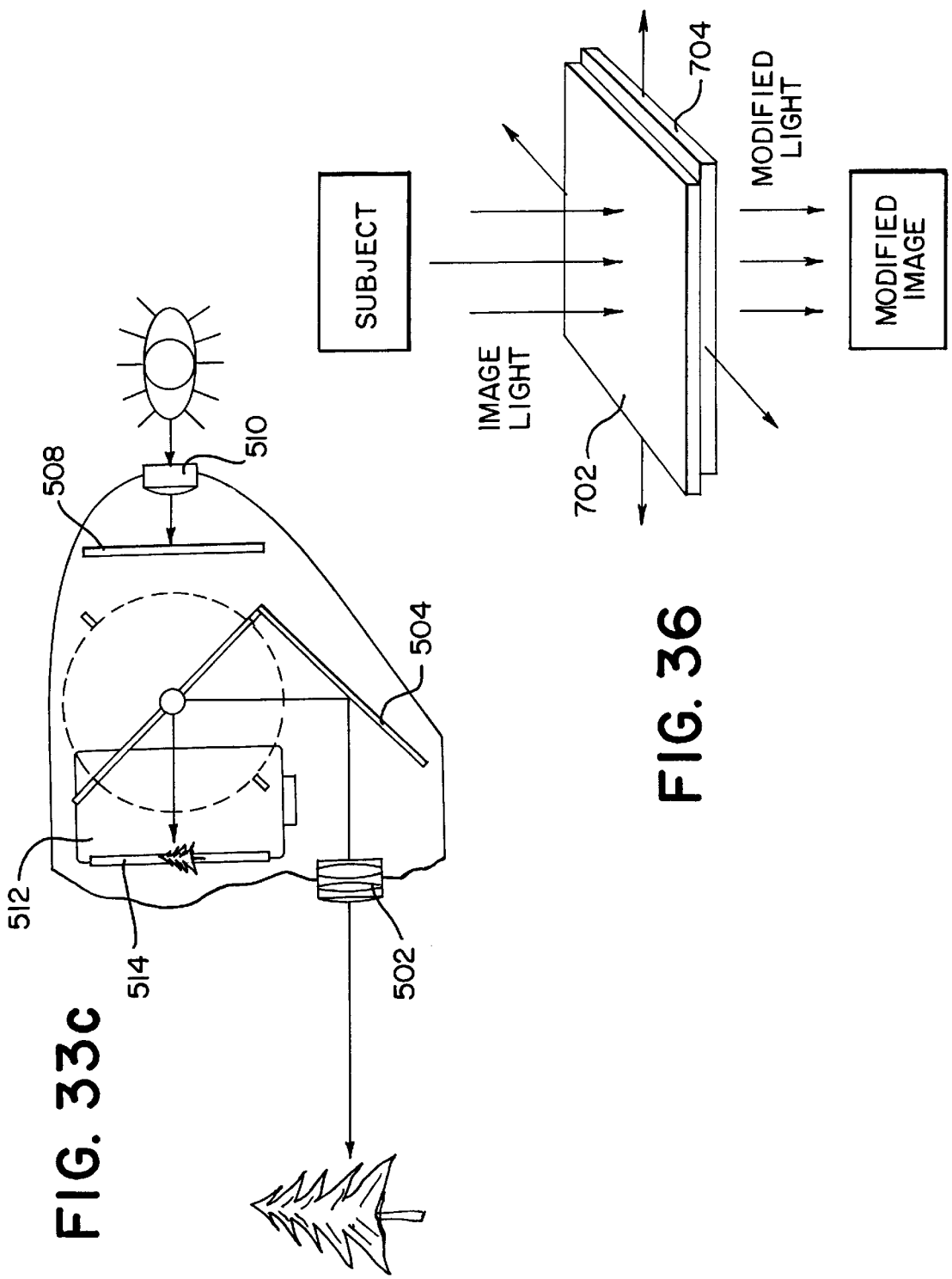

IMAGE MODIFIERS FOR USE IN PHOTOGRAPHY

RELATED APPLICATIONS

This is a Continuation-in-Part patent application based on International Application No. PCT/US97/08605, filed on May 9, 1997, which is a Continuation-in-Part of U.S. Ser. No. 08/526,990, filed on Sep. 12, 1995, which issued on Jul. 15, 1997 as U.S. Pat. No. 5,649,259. The entire disclosures of both the above-identified PCT application and U.S. Pat. No. 5,649,259 are hereby incorporated by reference.

BACKGROUND OF THE INVENTION

1. Field of the Invention

This invention relates generally to photographic image modifying equipment, and more particularly, to photographic image modifiers for introducing to a photographic negative during its exposure of an image a special effect such as an effect which is indicative of a painting.

2. Description of Related Art

The art of creating special effects in the field of photography has been very active in the past and continues to grow with the increasing interest in photography and the desire for more interesting visual illusions. Devices have been developed, for example, to alter an image prior to or during its exposure on film. Typically, these devices are attached at the end of the lens of a camera, and directly interfere with the light prior to it reaching the film. The alterations or effects applied to the incoming light vary from common color-filtering changes to superimposing "sub-images" onto the same frame of film that is recording the "real" image. For example, placing an opaque, pre-shaped matte in front of a portion of the incoming light will block a correspondingly shaped portion of the film. This results in an unexposed area of film which may be later "filled-in" with another image to create one desired illusion or effect. Similar diffusion mattes are used in "still photography" to produce progressively under-exposed boarders to a frame of film being exposed, creating a vignette boarder.

Conventional devices have also been used to superimpose an image of characters such as a date or other alpha-numeric information onto a portion of an image on a frame of film. Typically, these devices, such as the device disclosed in U.S. Pat. No. 1,504,959 issued to Leschbrandt, include a translucent plate (or ribbon) having, for example, opaque characters positioned at the film plane in a camera. The plate of characters is aligned adjacent to and in front of the surface of the film. Light from an external source or light generated from within the camera is used to superimpose selected characters of the plate onto a portion of the film.

U.S. Pat. No. 3,916,423, issued to Ueda et al. discloses a device for transposing information (characters, lines or designs) onto the surface of film during exposure of the film to an image. A transparent plate having an opaque mask is attached to a film cartridge in front of and adjacent to a frame of film. During exposure, a portion of the light from the image is blocked by the opaque mask located on the transparent plate prior to the light reaching and exposing the film. The result is under-exposed regions of the film (negative) corresponding to the particular shape of the opaque mask. When the negative is used to expose a positive print, the shape of the particular opaque mask will be positively transposed in the form of dark overexposed regions in the final print.

One limitation with these prior art special effects devices is that they all rely on blocking a portion of the incoming light prior to the light reaching the film. Although many effects may be created using the prior art methods employing opaque masks, many other effects require more subtle, diffusion methods.

Oftentimes, when a photograph is taken of a particular subject within a particular scene, the lighting conditions and lighting distribution within the scene and the reflective characteristics of the subject will cause areas on the film negative to become either overexposed or underexposed relative to the "normal" exposure range of the film. A conventional camera usually includes at least one integral light meter which is used to measure the average intensity of light entering the camera prior to exposing the film. The light meter generates an electrical signal that is interpreted by a computer and is used to control either the size of the aperture of the lens, the speed of the shutter, or both, so that the average intensity of light is compensated throughout the entire picture, as recorded by the film. With some more advanced cameras, such as the N-90, N90s, and F5 cameras manufactured by Nikon of Tokyo, Japan, several separate light meters are used, each measuring the intensity of light within a particular zone or region of the frame (an upper region is used to measure the intensity of light from the sky of the scene, for example. Although the use of several light meters to measure the different light intensities at different regions of a framed scene provides a more accurate average light intensity reading, the camera cannot control the amount of light from a particular region of the framed scene reaching the corresponding region of the film without effecting the amount of light reaching the other regions of the film. In other words, the overall density of the negative can be corrected by adjusting either the aperture of the lens or the operating speed of the shutter, however, this exposure correction has a uniform effect over the entire recording area of the film (i.e., the frame). If the aperture is decreased to lessen the amount of light reaching the film to compensate for the "bright" spots of the subject or scene, for example, the otherwise "neutral" or normal areas of the subject or scene will now become too dark. If the speed of the shutter is prolonged to "burn in" the darker regions of the image, the normal areas will become unacceptably overexposed and appear "washed out".

Unfortunately, since a conventional camera merely measures the average of the total received light entering the camera of a particular image, many pictures end up with a portion of the recorded image either overexposed (to dark) or underexposed (washed out).

In an attempt to prevent this relatively common exposure malady from ruining an otherwise good picture, serious photographers have made it common practice to take several pictures of the same image (i.e., bracket the image) and then vary the exposure of the image between each shot, (typically around ⅓ EV) so that each image offers a slightly different exposure from which the photographer may later select the recorded image that averages the received light most accurately. The above-identified N-90 manufactured by Nikon offers a bracketing feature with its M-26 data-back accessory which allows the camera to automatically take a selected number of pictures and vary the exposure a preset degree between shots.

There are several problems with the bracketing technique of photography. Not only is a lot of film exposed for few different images, only relatively expensive cameras offer exposure control, let alone automatic bracketing of the exposure. Also, although exposure bracketing provides several pictures to select from, since the camera's exposure meter must account for the total received light and may not locally correct the exposure of a portion of the image frame, all of the bracketed pictures will show varying degrees of over and under-exposure. In other words, if there is an overexposed region of an image, bracketing will not correct the exposure of that particular region, merely hide it by changing the total exposure throughout the image, as recorded by film.

Other attempts have been made to control the exposure of a particular region of a frame of film, without effecting the exposure of the other regions of the frame of film. Special segmented, or zone filters include regions of varying opacity which may be aligned within a particular scene to compensate for highlighted regions, such as a cloudy sky. These filters rarely align with the image detail and are only useful when the specific regions defined by the filter align with the regions of the scene.

Once a negative is developed, any underexposed or overexposed regions may be compensated during the production of a photographic print using well known techniques known as "dodging" or "burning" in which a density mask (made from opaque and semi-transparent sheet material) is held in the exposure path (over the photographic paper) when a print is being made from a negative. The mask is used to selectively protect overexposed areas of the negative from a portion of the light projected to the photographic paper during image enlargement (or print processing). However, these techniques are used in expensive custom print processing, not in cheaper automated print processing. These techniques are difficult to uniformly perform on a repeated basis because of the inherent inaccuracies in placing the density mask in the proper location each time a print is made and also require a great amount of time to adjust the mask from print to print. Furthermore, the results of these exposure compensating techniques are not known until after the print is exposed and developed. If the results are unsatisfactory, another attempt must be made in a trial-and-error method until a satisfactory print is produced.

It is accordingly an object of the invention to provide a special effects device for use in photography which overcomes the limitations of the prior art.

It is another object of the invention to provide such a device which enables a photographer to transform photographic images into images having characteristics inherent in paintings of such images.

It is another object of the invention to provide such a device which enables a photographer to superimpose a translucent mask including random crackling onto an image, resulting in a final print which includes the craquelure characteristics of aged oil paintings.

It is another object of the invention to provide such a device which enables a photographer to superimpose a translucent mask onto an image to transpose the image to one having characteristics inherent in a water color painting.

It is another object of the invention to provide such a device which enables a photographer to superimpose a translucent mask onto an image to transpose the image to one having characteristics inherent in an oil pallet-knife type painting.

It is another object of the invention to provide a method and apparatus for producing a photographic negative wherein areas of overexposure and underexposure may be corrected prior to the film being exposed.

It is another object of the invention to provide a regional exposure correction to selected regions of an image to be recorded on film, wherein the regions may follow the specific contours of a scene, object or subject located within the image.

It is another object of the invention to provide a preview image of an exposure-corrected image prior to the image being recorded on film.

It is yet another object of the invention to provide various degrees of regional exposure correction to an image.

It is yet another object of the invention to provide a method and apparatus for selectively modifying an image using a single modifier located adjacent to the film.

It is yet another object of the invention to provide movement of a selected modifier during exposure so that a multitude of effects can be generated from a single modifier.

SUMMARY OF THE INVENTION

In a first embodiment, the invention comprises a transparent plate mounted at the film plane within a camera. The transparent plate has a translucent diffusion pattern which diffuses incoming light rays reflected from the subject and effectively repositions them in a controlled manner prior to their exposure on film. Proposed diffusion patterns may alter the light rays to create characteristics indicative of various types of paintings.

In another embodiment of the invention, the transparent plate having the translucent diffusion pattern is mounted in a film cartridge.

In another embodiment of the invention, a length of plastic film (a pattern strip) is positioned adjacent to a similar length of photographic film (film strip). An appropriate translucent diffusion pattern is provided onto one surface of the pattern strip, along its entire length. Both strips are rolled into a conventional 35 mm film canister and dispensed simultaneously, as needed (within the camera) so that each frame of film has a separate mask in front of it, at the film gate of the camera.

In another embodiment of the invention, a transparent plate having a translucent diffusion pattern is positioned between the main lens of the camera, and the camera body. In this arrangement, a correcting lens is required to bring the pattern of the particular pattern into sharp focus with the image at the film plane to be exposed on film.

In another embodiment of the invention, an LCD is mounted in front of the film of a camera and is used to compensate for specific regions of an image before the image light exposes the film.

In another embodiment of the invention, a number of transparent members, each having a different translucent diffusion pattern is slidably moveable between a stowed position which is remote from the film gate of the camera, and a film gate position wherein one or more transparent members are positioned within the film gate, between the film and the camera's lens.

In yet another embodiment of the invention, a disposable SLR-type camera includes a pivotal mirror located between the camera's lens and eyepiece that may be rotated to a first position wherein incoming light from an image is directed to the eyepiece, and a second position wherein the incoming light is directed to film. The rotatable mirror may function as a light modifier and may be easily replaced with other modifiers.

In yet another embodiment of the invention, a modifier coupler assembly is positioned between a camera body and a conventional lens, and includes a primary lens assembly, a secondary relay lens using planar micro-lenslet arrays, a second (intermediate) focal plane and a modifier receiving slot for receiving modifiers to effect an image at the secondary focal plane.

In another embodiment of the invention, the above-described modifier coupler includes a tiltable primary lens assembly and a tiltable modifier, as controlled by the photographer to impart additional effects to the incoming image light.

BRIEF DESCRIPTION OF THE DRAWINGS

In some instances, a group of figures, for example, FIGS. 35a–35b, may be referred to collectively as "FIG. 35".

FIG. 2b is a side view of the optical modifier of FIG. 2a;

FIG. 24 is a representative illustration of a photograph showing two flowers whose image light has been diffused by one of the optical modifiers, in accordance with the invention;

FIG. 25 is a representative illustration of a photograph showing two flowers whose image light has been diffused by another optical modifiers, in accordance with the invention;

FIG. 26 is a front view of an optical modifier turret assembly, in accordance with another embodiment of the invention;

FIG. 27 is a sectional side view of the modifier shown in FIG. 26, taken along the lines 27—27;

FIG. 28 is partially sectional front view of a modifier disc, taken along the lines 28—28 of FIG. 27;

FIG. 33 is a schematic of a single-use SLR-type camera, according to another embodiment of the invention, showing a pivotal mirror located in a viewing position;

FIG. 33b is a schematic of the camera of FIG. 33a, showing the pivotal mirror re-positioning from the viewing position to an exposing position, according to the invention;

FIG. 33c is a schematic of the camera of FIG. 33a, showing the pivotal mirror located in the exposing position, according to the invention;

FIG. 36 is a schematic of a modifier assembly, according to another embodiment of the invention;

DETAIL DESCRIPTION OF THE PREFERRED EMBODIMENT

Figure 1:
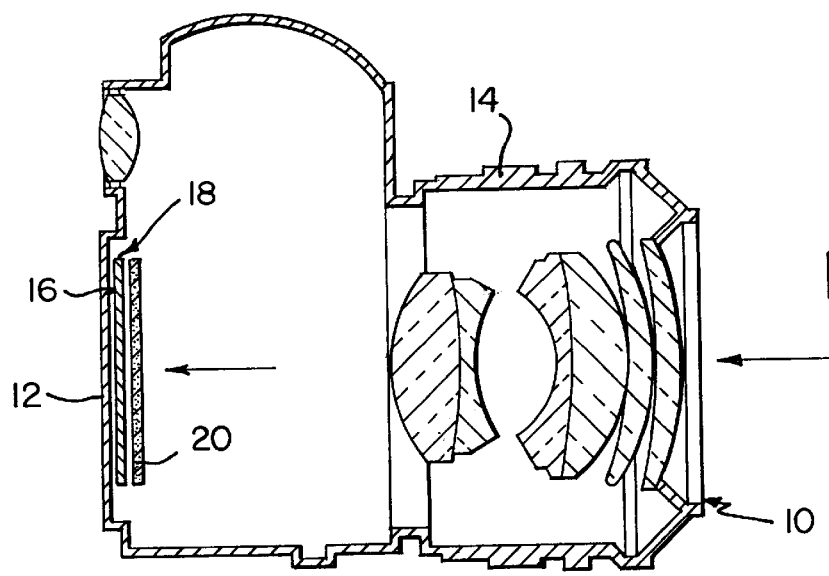
FIG. 1 is a sectional side view of a single lens reflex (SLR) camera showing a film strip, an optical modifier plate, a film plane, a lens assembly, and incident light rays, in accordance with a first embodiment of the invention.
Figure 2A:
FIG. 2a is a plan view of an optical modifier, in accordance with another embodiment of the invention.
Figure 2B:
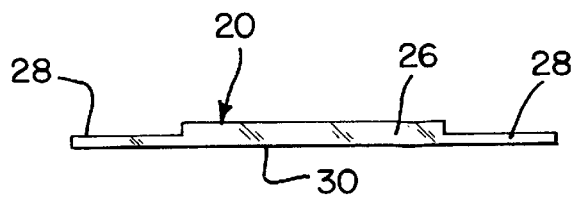
Figure 2C:
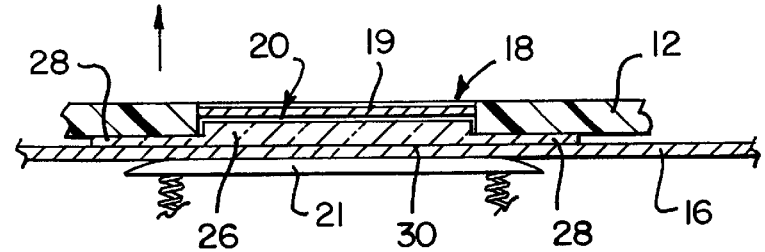
FIG. 2c is a cross sectional side view of a camera film gate showing the optical modifier of FIG. 2b in position within the film gate.

Referring to FIG. 1, a camera 10 (an SLR) is shown having a camera body 12, a lens assembly 14 attached to a front side of the camera body 12, and a frame of film 16 shown in cross section at a film gate 18 (see also, FIG. 2c). An optical modifier 20, in accordance with a first embodiment of the invention, is positioned in front of the film 16 within the film gate 18. The specific structures of both the film gate 18 and the shutter mechanism 19 of the camera 10 are conventional and are therefore not shown in full detail. In this embodiment, the shutter mechanism 19 is located in front of (i.e., closer to) the lens 14, the modifier 20 and, of course, the frame of film 16.

The modifier 20, described in greater detail below, is sized and shaped to fit within the film gate 18 between the film 16 and the shutter of the camera 10. A conventional, spring-loaded, film pusher plate 21 which is usually mounted to the inside surface of the door (not shown) of the camera (used to access the film) lightly pushes the film flat across the film gate 18, and adjacent a rear surface of the modifier 20.

Referring to FIGS. 2a through 2c, the modifier 20, in accordance with one embodiment of the invention includes a transparent plate 22 and a diffusion pattern 24. The transparent plate 22 is preferably shaped to include a raised (or thicker) center section 26 which defines two (thinner) edge sections 28. The edge sections 28 are designed to contact portions of the camera positioned adjacent to the film gate 18 to hold the entire modifier 20 in the camera with the center section positioned within the film gate 18 of the camera 10, as shown in cross-section in FIG. 2c.

The diffusion pattern 24 functions as a translucent mask by diffusing and distorting the incident light prior to it reaching and exposing the film. The diffusion pattern 24 preferably does not prevent the light from reaching the film (i.e., the pattern is not opaque). The transparent plate 22 of the modifier 20 is preferably made from an optical-grade plastic, however, optical grade glass may also be used. The diffusion pattern 24 is preferably formed on a rear surface 30 (facing the film 16 when installed in the camera 10) of the transparent plate 22.

A preferred method of forming the diffusion pattern 24 is to emboss the particular pattern (or its negative or reverse) into the rear surface of the plastic transparent plate 22. A reverse pattern is first machined into a stamping surface of a hard material. The plastic transparent plate 22 is then softened (by using flameless heat, such as steam or electric filament or through the use of other indirect heating) and pressed against the stamping surface so that the pattern is transformed into the rear surface of the plastic plate 22, thereby creating the diffusion pattern 24. When incident light rays pass through the modifier 20 and strike a portion of the diffusion pattern 24, the particular rays are scattered or diffused somewhat randomly, but are not blocked, prior to the light reaching and exposing the film.

The diffusion pattern 24 effectively distorts the incoming light, and therefore also the image, in a controlled manner. The distortion of the image follows the particular diffusion pattern 24 which is discernable, because the transparent plate 22 and the pattern 24 are both located at the film plane (also called the focal plane) and are in soft focus (not sharp). The pattern 24 appears somewhat softened (not in sharp focus) because although the pattern 24 is effectively at the point of focus, the pattern 24 is not a mask (not opaque), but a light diffuser which disperses the incident light by a small amount just before it reaches and exposes the film. This controlled dispersion of the light aids in achieving the desired special effect to the exposed image, as discussed below.

It is preferable that the modifier 20 be located as close to the surface of the film as physically possible. If the modifier 20 is the type which is stationary with respect to the camera, as shown in FIGS. 2a–2c and discussed above, it is preferable that the modifier not make contact with the film, to avoid unwanted scratches as the film is advanced.

There are several embodiments for positioning the modifier 20 within the film gate 18 and adjacent to the focal plane of a camera. These are described as follows, referring to FIGS. 3 through 14.

Figure 3:
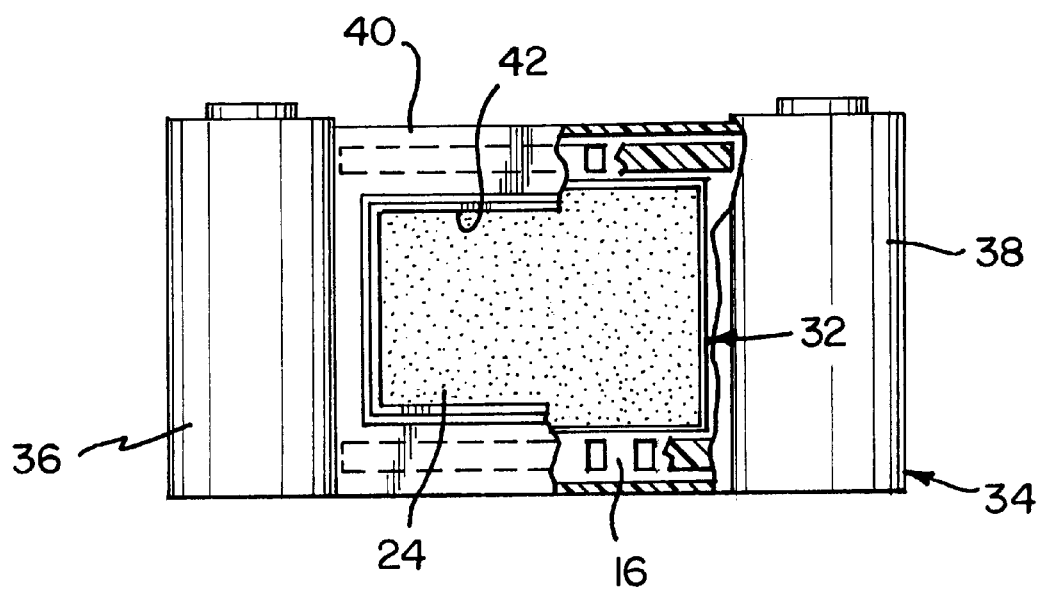
FIG. 3 is a partially sectional front view of a film cassette employing a optical modifier plate, in accordance with another embodiment of the invention.
Figure 4:
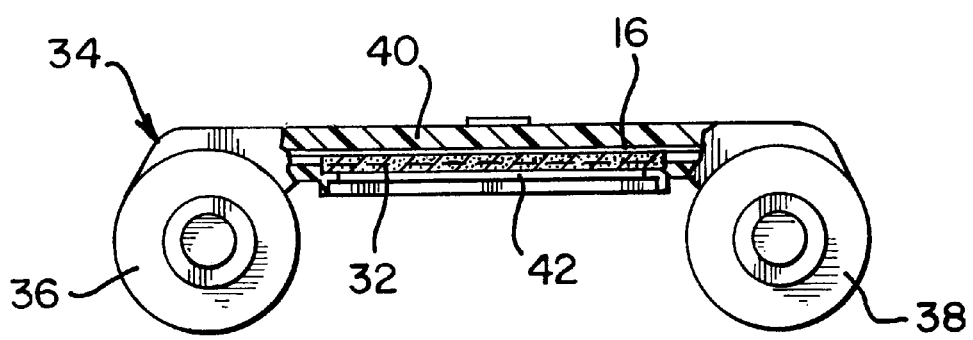
FIG. 4 is a partially sectional top view of the film cassette shown in FIG. 3.

Referring to FIGS. 3 and 4, an optical modifier 32 in accordance with the invention is incorporated into the structure of an otherwise convention film cassette 34 (typically referred to as film-type 120). The cassette 34 includes a film supply section 36, a film pick-up section 38, and a connecting portion 40 connecting the film supply section 36 with the film pick-up section 38. The connecting portion 40 includes an integral film gate 42 which aligns with the film gate of the camera (not shown) which is adapted to receive the cassette 34. The modifier 32, in this embodiment, is preferably positioned (during manufacture of the cassette 34) within the structure which makes up the connecting portion 40 so that it lies across the film gate 42 and adjacent the film 16.

The modifier 32, as in the above-described embodiment of FIGS. 1 and 2a–2c, includes a specific diffusion pattern 24. The position of the modifier 32 forces all light passing through the film gate 42 to also pass through the modifier and become slightly diffused prior to the light reaching and exposing the film 16.

Figure 5:
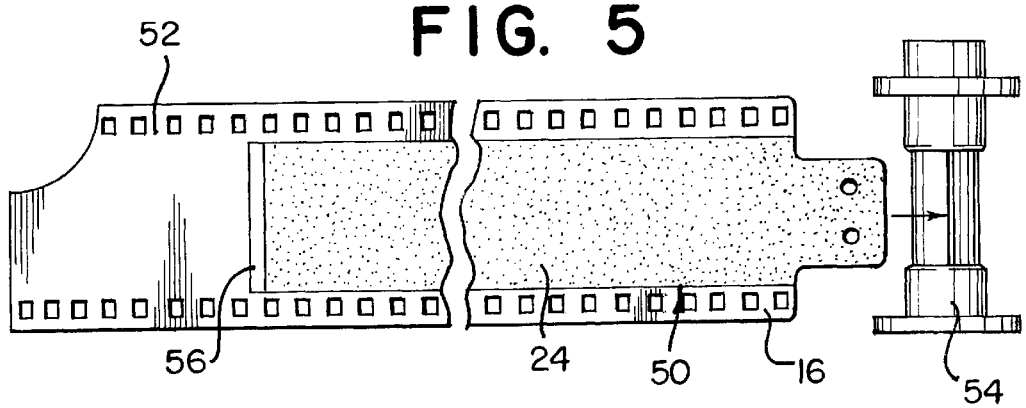
FIG. 5 is a front partial view of a film strip, optical modifier strip, and film bobbin, in accordance with another embodiment of the invention.
Figure 6:
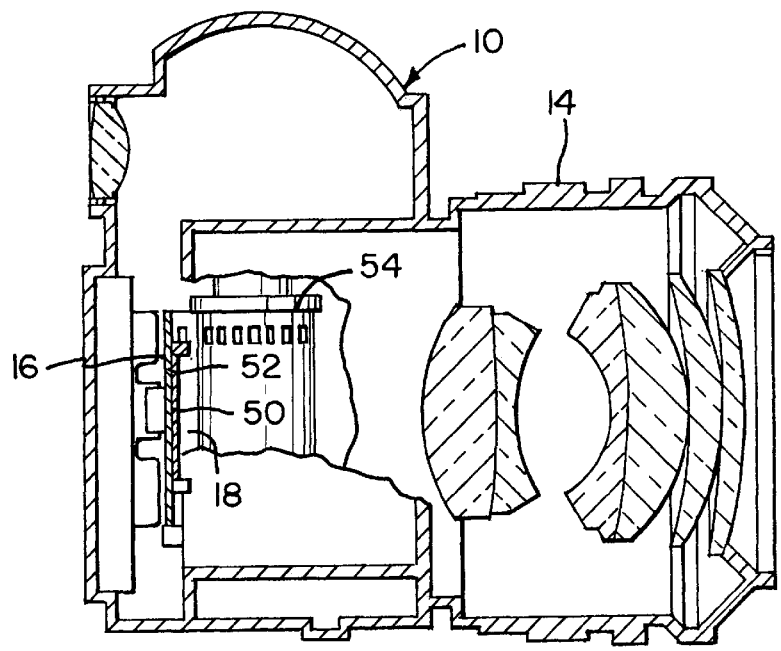
FIG. 6 is a sectional side view of a camera with the film strip, optical modifier strip and film bobbin of FIG. 5 in an operative position.

Referring to FIGS. 5 and 6, a modifier 50, in accordance with another embodiment of the invention is shown. Here, the modifier 50 takes the form of a thin translucent plastic strip (similar to the substrate material used in photographic film). The strip modifier 50 is affixed to the inside surface 52 (emulsion side) of an otherwise conventional roll of film 16 (type 35 mm). Both the film 16 and the affixed strip modifier 50 are rolled up together into the standard film canister (not shown) using the standard spool 54. It is preferred that the strip modifier 50 be attached only at selected points 56 such as the ends of the strip modifier 50 or perhaps between each frame (not shown) using a heat bond or an appropriate adhesive.

Although film 16 is shown as a 35 mm format, film 16 may be of any film format, including 120, 220, 4.∴.5, 110, and POLAROID™-type film/paper. In this later format, modifier 50 is attached to or is positioned across from each sheet of film/paper and is removed after exposure and development of the particular image.

FIG. 6 illustrates (in cross-section) a conventional SLR camera 10 (similar to the camera 10 shown in FIG. 1), having the film 16 of FIG. 5 installed. The strip modifier 50 is shown positioned in front of the film 16 (closer to the lens 14) and across the film gate 18.

Figure 7:
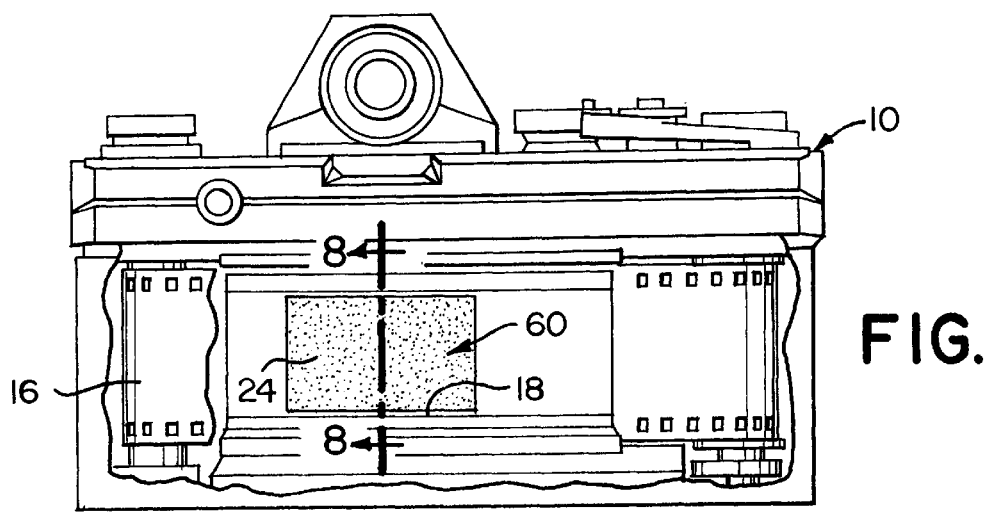
FIG. 7 is a rear view of the camera shown in FIG. 6.
Figure 8:
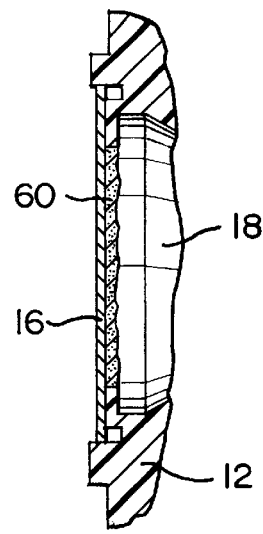
FIG. 8 is a partial side sectional view, taken along the lines 8—8 of FIG. 7, showing details of the film strip and the optical modifier strip at a film plane of the camera.
Figure 9:
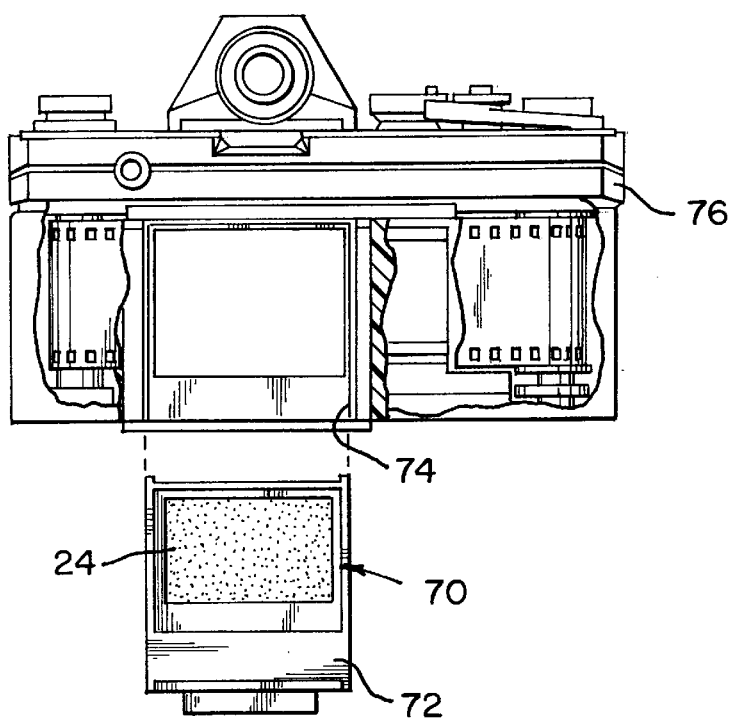
FIG. 9 is a sectional rear view of a camera showing an optical modifier cartridge in a non-operative position, in accordance with another embodiment of the invention.
Figure 10:
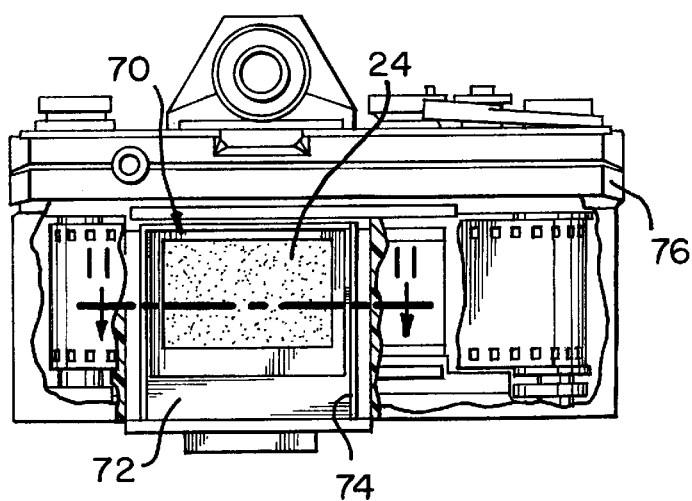
FIG. 10 is a sectional rear view of the camera of FIG. 9 showing the optical modifier cartridge in an operative position, in front of the film gate.

FIGS. 7 and 8 illustrate an optical modifier 60 in accordance with another embodiment of the invention which is similar to the modifier shown in FIGS. 2a–2c and discussed above. However, in this embodiment, the modifier 60 is the same size of the film gate 18, i.e., the modifier 60 does not include the edge sections 28. The modifier 60 is positioned permanently within the film gate 18 using an appropriate adhesive, for example. The modifier 60 may also snap into place within the film gate 18 using a close tolerance fit or appropriate ridges and/or detents. The modifier 60 shown in this embodiment is especially useful for disposable type cameras.

Figure 11:
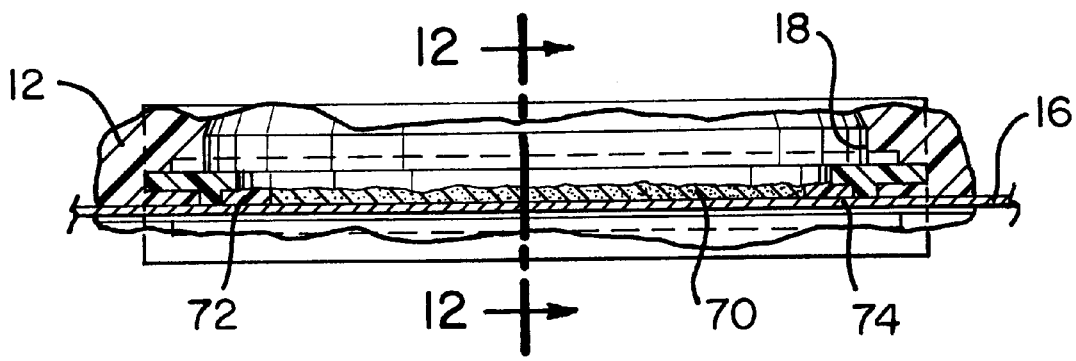
FIG. 11 is a partial top sectional view, taken along the lines 11—11 of FIG. 10, showing details of the film strip and the optical modifier cartridge at the film plane of the camera.
Figure 12:
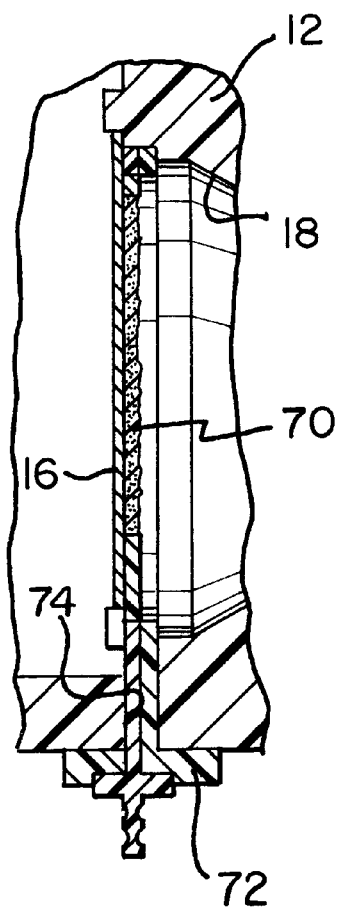
FIG. 12 is partial side sectional view, taken along the lines 12—12 of FIG. 11, showing details of film strip guides and the optical modifier cartridge (inserted)

Referring to FIGS. 9 through 12, yet another optical modifier 70 in accordance with the invention is shown. The modifier 70 is mounted into the frame structure of a cartridge 72. The cartridge 72 is a thin plate which is adapted to be inserted into a slot 74 located in a camera 76. The camera 76 is either specially made with the slot 74 or a replaceable camera back (not shown) may be provided having a slot 74. In either case, the slot 74 positions the cartridge 72 so that the modifier 70 (mounted within the cartridge 72) aligns into a position between the film gate 18 and the film 16, as shown in FIGS. 11 and 12. One of a variety of cartridges 72 (each having a different modifier 70) may be inserted into the slot 74. Each cartridge 72 preferably includes a handle which remains accessible when the cartridge 72 is inserted into the slot 74. The slot 74 and/or the insertable cartridge 72 includes an appropriate light-barrier to prevent unwanted light from entering the camera through the slot opening and exposing the film.

Figure 13:
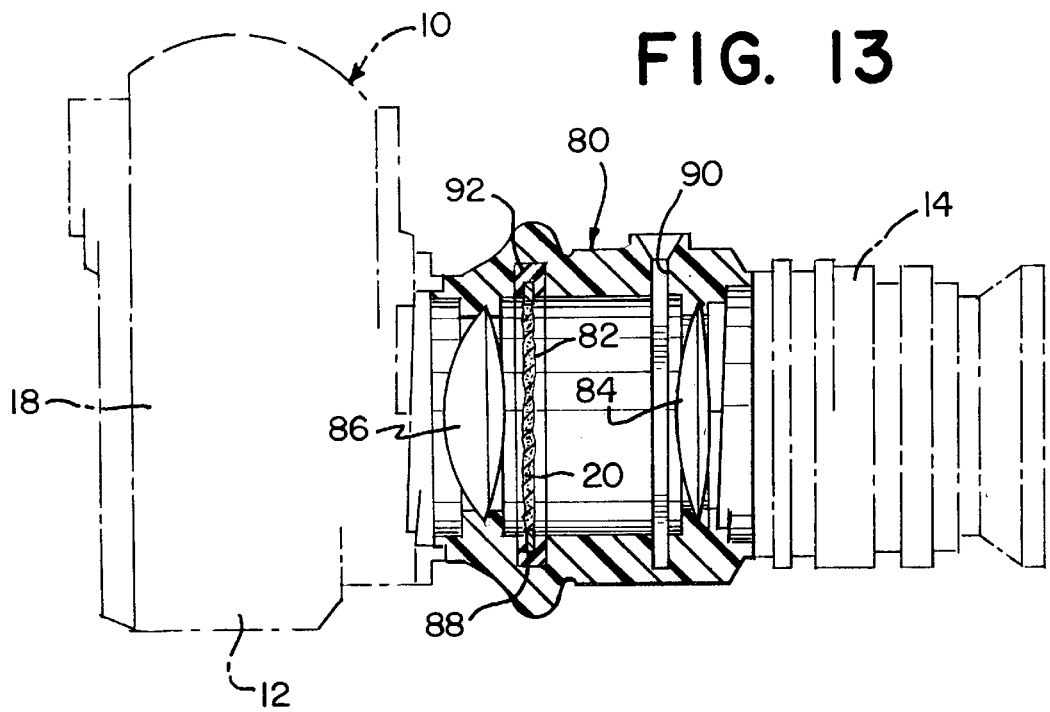
FIG. 13 is a sectional side view of a modifier holder connected between a camera body and a lens assembly (both shown in phantom), in accordance with another embodiment of the invention.
Figure 14:
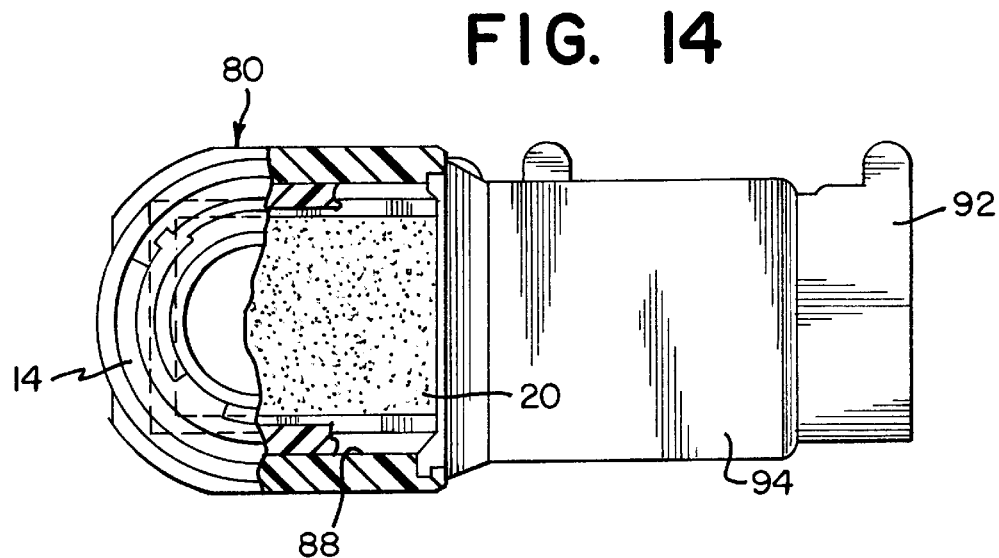
FIG. 14 is a partial sectional side view of the modifier holder of FIG. 13.
Figure 15:
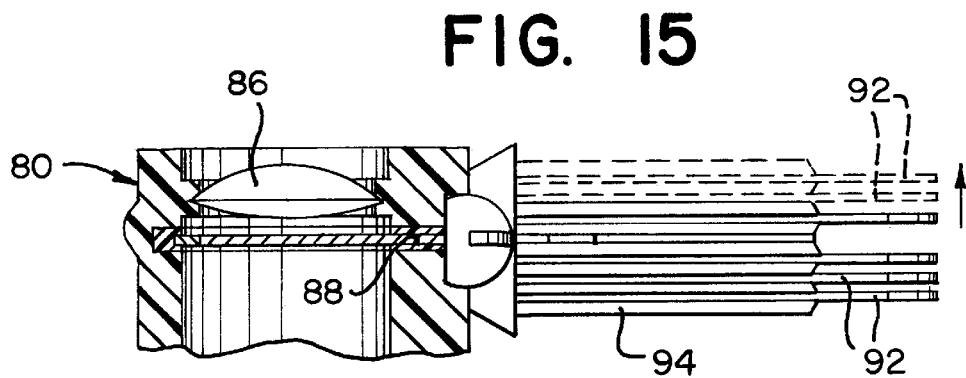
FIG. 15 is a partial sectional view of the modifier holder of FIG. 14.

Referring to FIGS. 13 through 15, another embodiment of the invention is shown. In this embodiment, a modifier coupler 80 is positioned between the camera body 12 and the lens assembly 14. The modifier coupler 80 couples the lens assembly 14 to the camera body 12 and passes the incoming light from the lens assembly 14 to the film gate 18 of the camera 10. The modifier coupler 80 includes an image plane 82, a primary lens assembly 84, a secondary lens assembly 86, a modifier receiving slot 88, and a filter receiving slot 90.

In this particular embodiment, each of several different modifiers 20 is mounted to a plate 92. Several selected plates 92 are mounted to a plate holder 94, as shown in FIG. 14. The plate holder 94 is adapted to be mounted to the modifier coupler 80, adjacent the modifier receiving slot 88. The plate holder 94 is mounted so that it may slide relative the modifier coupler 80 in such a manner that allows any selected one of the several plates 92 held in the plate holder 94 to align with the modifier receiving slot 88. The selected plate 92, once aligned with the modifier receiving slot 88, may be moved into the modifier coupler 80 so that the selected modifier 20 aligns with the path of incoming light from the lens assembly 14. A selected plate 92 is shown in an inserted position in FIGS. 14 and 15. Other light modifiers such as conventional filters may be inserted into the filter receiving slot 90.

As light enters the lens assembly 14, the internal lenses of the lens assembly 14 and the primary lens assembly 84 will focus the reflected light of a subject onto the image plane 82 of the coupler 80 (the image will be inverted). The inverted image is modified by the selected modifier 20 located at the image plane 82. From here the secondary lens assembly 86 re-focuses the image (and uprights the image) onto the film plane which is located at the film gate 18 of the camera 10.

An important feature of the invention, as shown in each of the above-described embodiments, is that the modifier 20, however it is introduced into the image light path, is located as close as possible to the focal plane of the camera 10 regardless of the location of the focal plane with respect to the film plane. As illustrated in the above embodiment (FIGS. 13–15), although a single focal plane is usually located at the film plane, it is possible to create two effective focal planes, one located a prescribed distance from the film plane towards the subject, the other located at the film plane 18.

Figure 16:
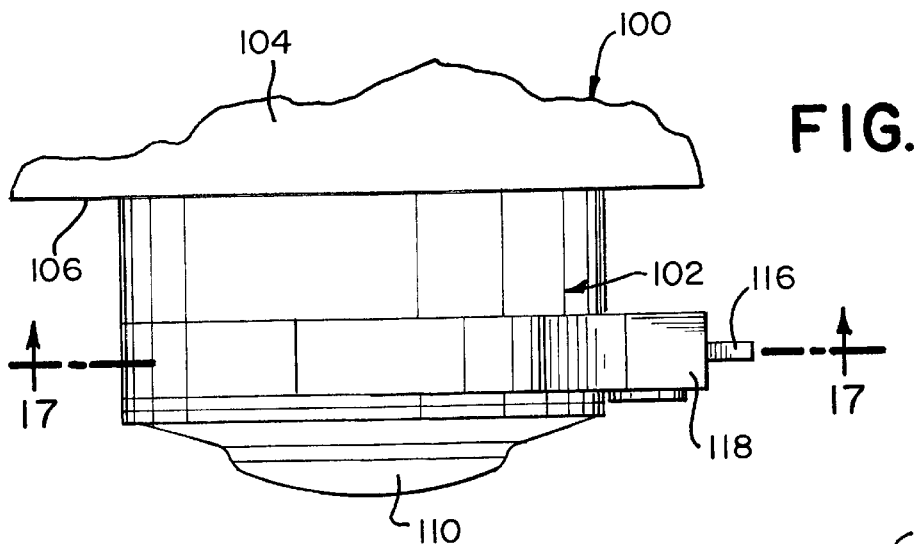
FIG. 16 is a top view of a disposable camera showing an optical modifier assembly in accordance with yet another embodiment of the invention.
Figure 17:
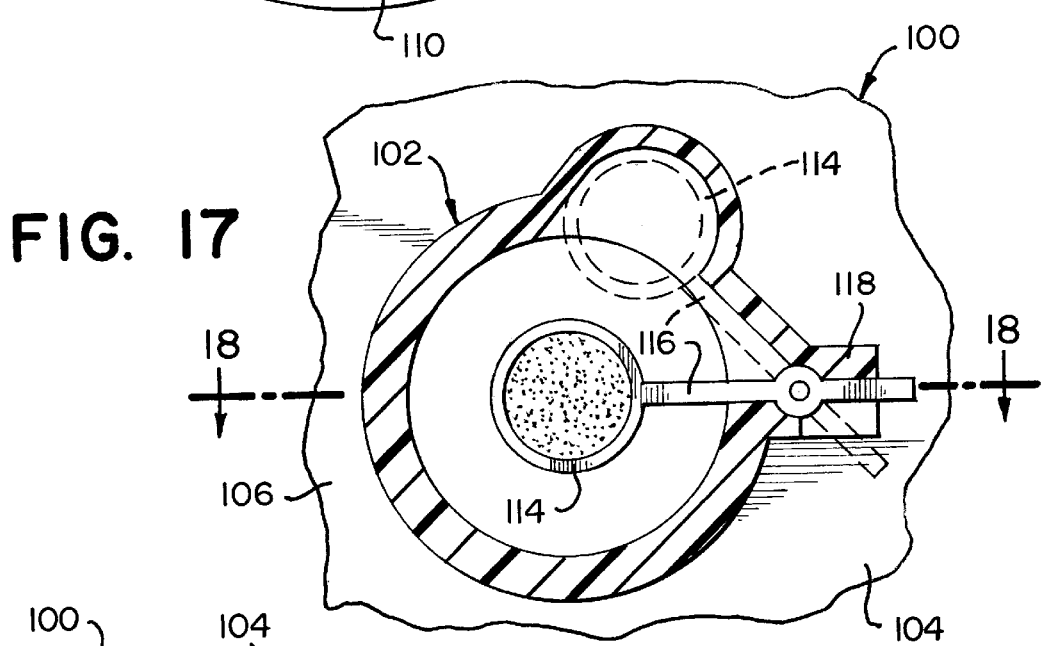
FIG. 17 is a partial sectional plan view of the camera and optical modifier assembly of FIG. 16, taken along the lines 17—17 of FIG. 16.
Figure 18:
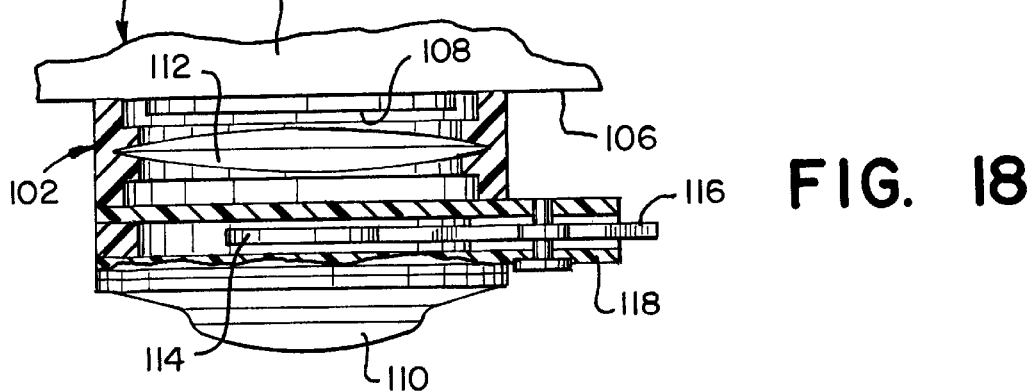
FIG. 18 is a partial sectional top view of the optical modifier assembly of FIG. 16, showing details of the optical modifier assembly, taken along 18—18 of FIG. 17.

Referring to FIGS. 16–18, a camera 100 having an optical modifier assembly 102 is shown, in accordance with another embodiment of the invention. The camera 100, in this particular embodiment is intended to be a disposable type made using relatively inexpensive parts and including a built-in supply of film. The camera 100 in this embodiment, of course may likewise be a non-disposable type.

The camera 100 includes a camera body 104 having a front face 106 and a lens aperture 108. The commercially available conventional disposable camera (i.e., one not including the modifier assembly of this invention) includes a lens (not shown) mounted within the lens aperture 108. The conventional lens (not shown) focuses a subject located in front of the camera, onto a frame of film located at the film plane (located in the rear of the camera). During the manufacture of these disposable cameras 100, applicant contemplates replacing the conventional lens (not shown) with the optical modifier assembly 102.

As shown in cross-section in FIG. 18, the optical modifier assembly 102 includes a first outer lens 110 located farthest from the film plane, and a second inner lens 112 located adjacent the front face 106 of the camera 100. An optical modifier 114 is located and movable within a plane lying between the inner and outer lenses (112, 110) and parallel to the film plane of the camera 100. The outer lens 110 focuses the light reflected off a subject located in front of the camera onto an intermediate focal plane 115. The inner lens 112 focuses the image located at the intermediate focal plane 115 onto the film plane. It is desirable to position the optical modifier 114 close to the intermediate focal plane so that the distortion applied to the light from the subject may be recorded on film in sharp focus (that is, as focused as the diffusion of the passing light through the modifier will allow).

As shown in FIG. 17, the optical modifier 114 is mounted to an arm 116. The arm 116 is pivotally connected to a housing 118 of the optical modifier assembly 102. A portion of the arm 116 is accessible to the user of the camera 100 and may be displaced, moving the optical modifier 114 between a stowed position (shown in FIG. 17 in dashed lines) wherein the incoming light passes directly to the film and is not otherwise distorted (except by the lenses), and an interference position wherein the optical modifier 114 is located in the path of the light (shown in FIG. 17, in solid lines).

Figure 19:
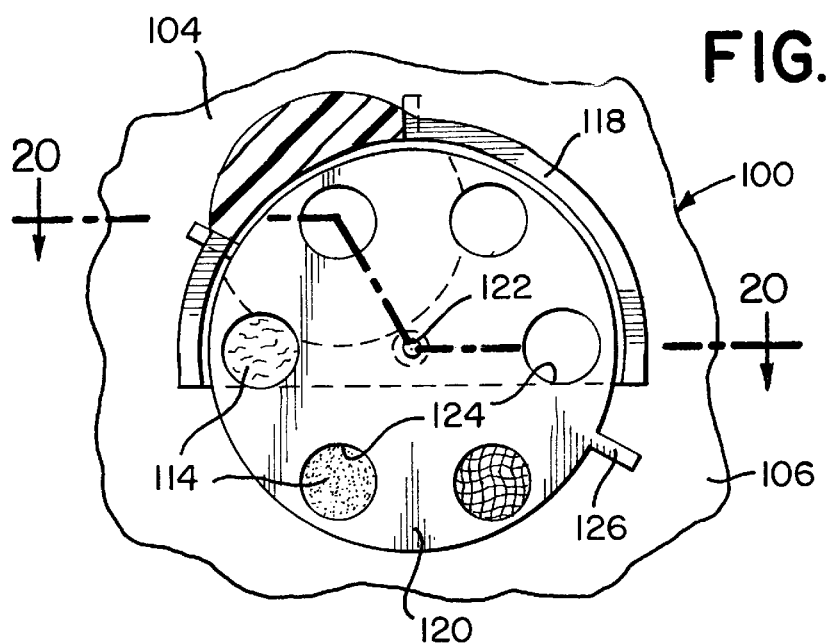
FIG. 19 is a partial sectional front view of an optical modifier, in accordance with yet another embodiment of the invention.
Figure 20:
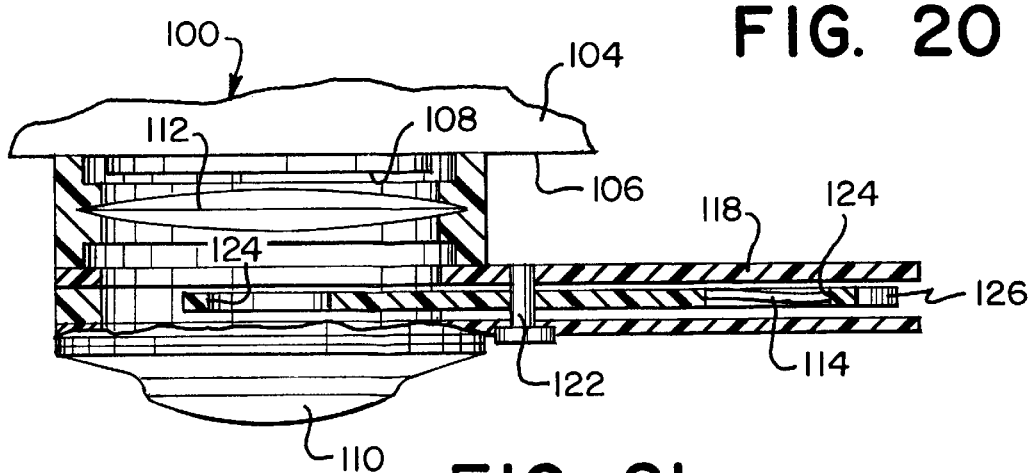
FIG. 20 is a partial sectional view of the optical modifier of FIG. 19, taken along the lines 20—20 of FIG. 19.

Referring to FIGS. 19–20, a preferred embodiment of the invention, as applied to disposable cameras, is shown, wherein the optical modifier 114 is mounted along the edge of a disc 120. The disc 120 is pivotally attached to the body of the camera 100 at a central pivot point 122. The disc 120 includes several peripheral openings 124 which include one of several different optical modifiers 114 for achieving different effects. The disc 120 is mounted so that any one of the openings 124 may be positioned in front of the lens aperture 108. The operator of the camera 100 may select a particular effect by rotating the disc 120 until the appropriate optical modifier 114 aligns with the lens aperture 108. A lever 126 may be provided for assisting in the rotation of the disc 120. Also, an indicator (not shown) may be included to point to indicia located on the face of the camera body, for example, indicating the particular effects in use.

Figure 21:
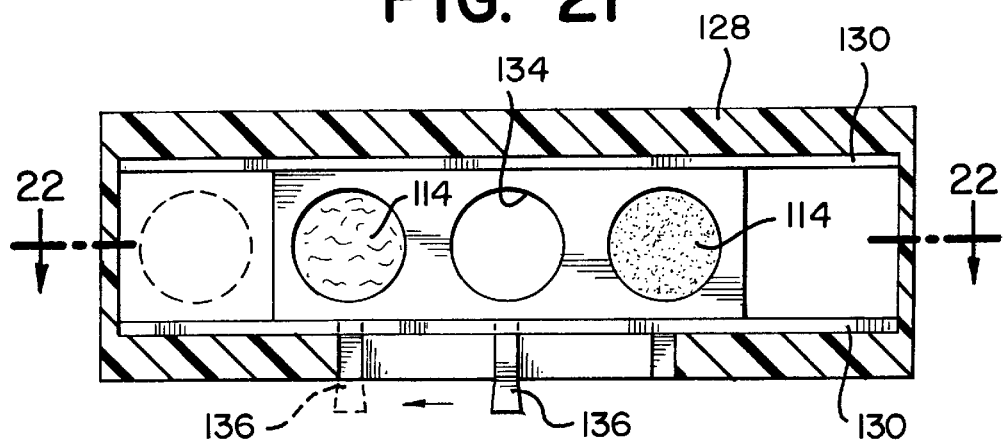
FIG. 21 is a sectional view of an optical modifier holder, in accordance with yet another embodiment of the invention.
Figure 22:
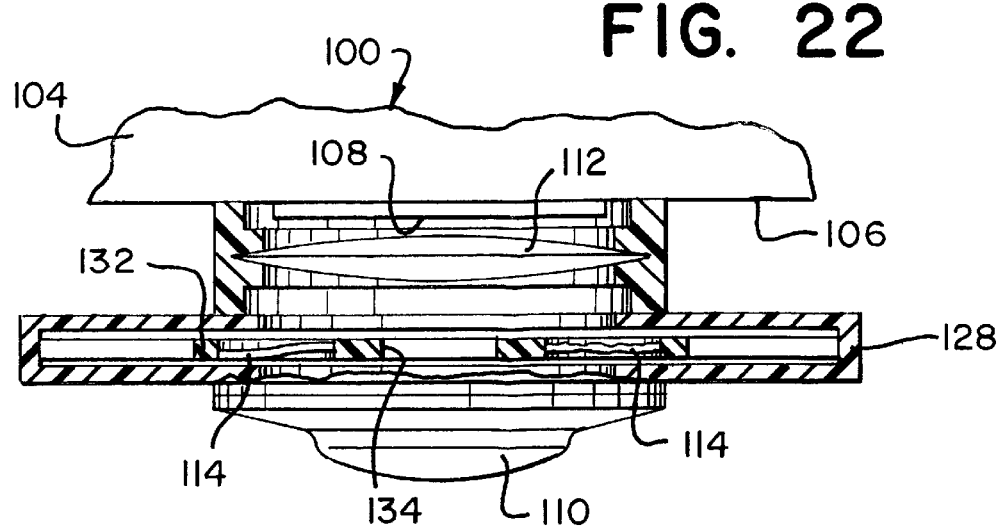
FIG. 22 is a partial sectional view of the optical modifier holder of FIG. 21, taken along the lines 22—22 of FIG. 21.

Referring to FIGS. 21–22, another embodiment of the invention is shown wherein the optical modifier 114 is mounted onto an elongated panel 128. The panel 128 include two parallel internal edges 130 which define an elongated window. Several sliding plates 132 are slidably positioned between the two edges 130. The panel 128 is mounted to the front face of the camera 100 so that each plate 132 may be selectively moved between a stowed position and a usable position, located in front of the lens aperture 108. Each plate 132 includes an opening 134 across which lies one of several different optical modifiers 114. Each plate 132 preferably includes an accessible handle 136 which may be grasped by the camera operator to move the plates 132 with respect to the lens aperture 108, as necessary.

Figure 23:
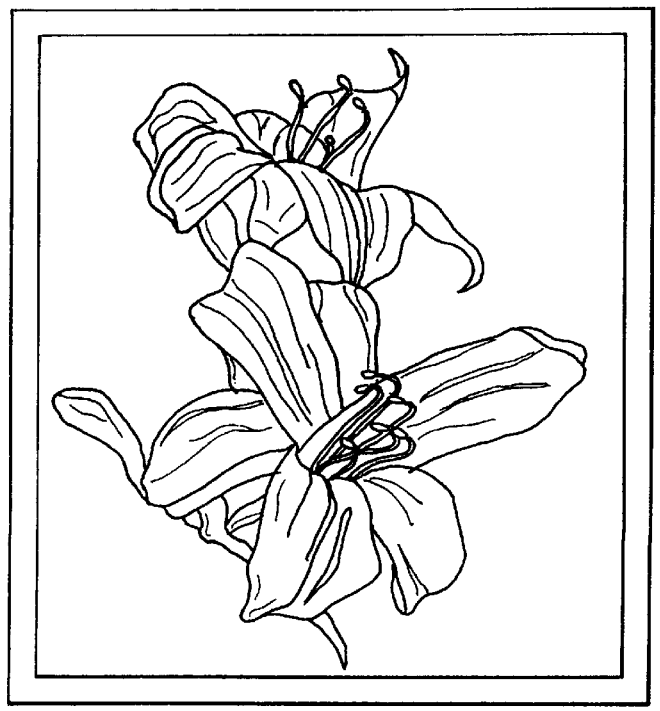
FIG. 23 is a representative illustration of a photograph showing two flowers.

As way of example, a representation of a non-modified photograph (of two flowers) is shown in FIG. 23. One purpose of the invention is to modify the image of a subject (i.e., the light reflected from the subject entering the camera) to introduce visual characteristics indicative of a painting. One particular optical modifier 114 modifies the image to introduce an impressionistic appearance, as shown in FIG. 24. Here, all the detail is distorted, yet the image remains substantially in focus. Another optical modifier 114 introduces a "craquelure" effect (typical of old oil-base paintings) to the original flower image so that the resulting print resembles FIG. 25.

Of course, a variety of painting characteristics may be introduced as an optical modifier or effect using the modifiers of the present invention.

Another embodiment, similar to the one shown in FIGS. 19 and 20 and described above, is shown in FIGS. 26–28 and includes a modifier housing 200, a modifier turret 202, and a primary-lens housing 204. The modifier housing 200 is preferably formed integrally with a face of a disposable-type camera 206, yet could also be formed separately and adapted to attach to a face of any camera 206 to be used as a camera attachment. The modifier housing 200 includes a front wall 208 and an aperture 210 which is aligned with the primary-lens aperture 212 of the camera 206. A secondary-lens tube 214 is located behind the front wall 20 and preferably includes an appropriate lens (not shown) which is designed to re-focus an image located at an intermediate focal plane 216 onto the film. The intermediate focal plane 216 is preferably located just in front of the front wall 208, at the location of the modifier turret 202.

As shown in FIG. 27, the modifier turret 202 is pivotally connected to a portion of the modifier housing 200 at a pivot pin 218. The modifier turret 202 is rotatable about the pivot pin 218.

The primary-lens housing 204 is preferably fixed relative to the camera 206 and the modifier housing 200 by the pivot pin 218 or by being formed integrally with (or otherwise connected to) the camera 206. The primary-lens housing 204 supports a primary lens 220. The primary lens 220 is designed to focus the incoming light reflected from an image in front of the camera to the intermediate focal plane 216. The primary lens 220 may be mounted in a primary-lens tube 222.

The modifier turret 202 includes at least two openings 224, as shown in FIG. 28. One opening 224 may include an optical modifier 226, for example. The other opening (or openings) shown in FIG. 28, may be left open, include a clear element 227 or a translucent element having a frosted surface or include another optical modifier element. Other variations of the modifier turret are possible including several different modifiers such as one for producing "craquelure", impressionism, or other painting-related effects.

As shown in FIG. 28, the modifier turret 202 preferably further includes indicia 228 or other indication of the type of modifier (or lack thereof) in use. The primary-lens housing 204 may further include an indicator opening 230 which aligns with the indicia printed on the modifier turret 202 so that an operator may view the indicia 228 to learn which modifier, if any, is located in the path of incoming light and will effect the film.

The turret 202 further includes a rubber O-ring 232 along its periphery to ensure high friction for positive gripping while being rotated by an operator. The O-ring is shown in FIG. 27. Other gripping peripheral surfaces include a roughened edge (not shown) and serrations 234 shown in FIG. 28, in place of the rubber O-ring 232 of FIG. 27.

In operation, the operator rotates the modifier turret 202 while viewing indicia 228 through the indicator opening 230 until a desired modifier effect is indicated. When the appropriate modifying effect is indicated through the indicator opening 230, the modifier will be in position in front of the primary lens 220 and will effect the film accordingly.

Figure 29A:
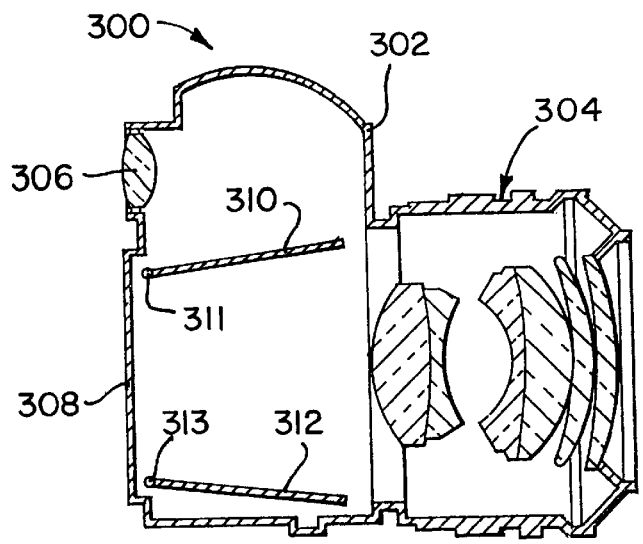
FIG. 29a is a sectional view of a camera, according to another embodiment of the invention, showing a film gate and two pivotal modifiers located in a stowed position.
Figure 29B:
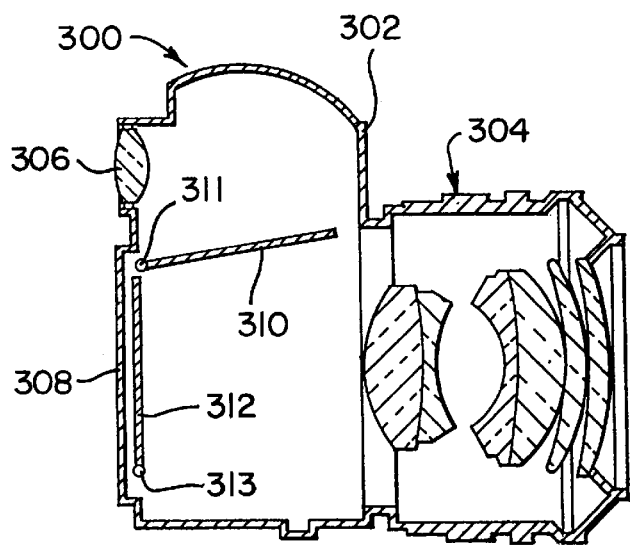
FIG. 29b is a sectional view of the camera of FIG. 29a, showing a first modifier located in the stowed position and the second modifier located within the film gate.
Figure 29C:
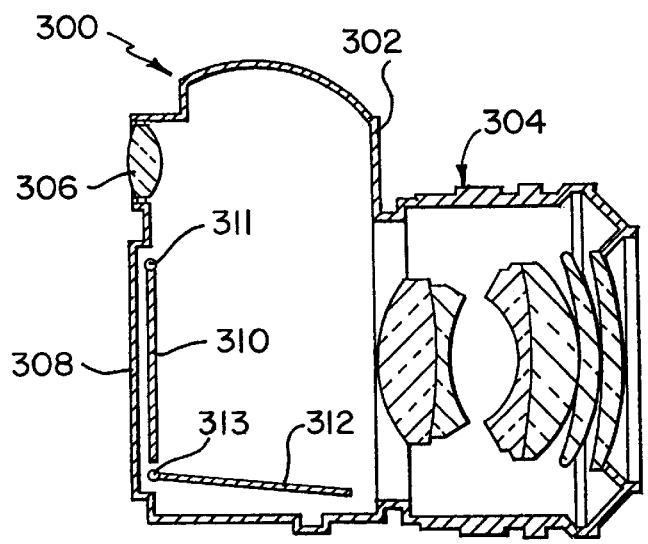
FIG. 29c is a sectional side view of the camera of FIG. 29a, showing the first modifier within the film gate and the second modifier located in the stowed position, according to the invention.

Referring to FIGS. 29a–29c, a camera 300, according to another embodiment of the invention includes a body 302, a lens assembly 304, an eyepiece 306, a film gate 308, a first pivotally mounted modifier 310 pivotal about a first pivot point 311 and a second pivotally mounted modifier 312 pivotal about a second pivot point 313. For clarity, only two modifiers 310, 312 are shown in this embodiment. Depending on the type of camera and the mechanism used to displace each modifier, four or more modifiers may be implemented with this embodiment.

Each modifier is pivotal between a stowed position wherein incoming light entering camera 300 through lens assembly 304 is not interrupted, allowing the light to reach film (not shown) located within film gate 308, when the shutter (not shown) is open. FIG. 29a shows both modifiers 310, 312 in the stowed position, in which case, camera 300 will function similar to a conventional camera in that unmodified pictures will be recorded on film.

FIG. 29b shows second modifier 312 located within or just adjacent to film gate 308 (and also in front of the shutter and the film), while first modifier 310 remains in the stowed position. With this arrangement, image light entering camera 300 through lens assembly 304 must pass through the transparent (or translucent) modifier 312 prior to reaching the film. Therefore, the image light is altered by second modifier 312, as described earlier in this application.

FIG. 29c shows first modifier 310 located within or just adjacent to film gate 308 (and also in front of the shutter and the film), while second modifier 312 is relocated back to stowed position. With this arrangement, image light entering camera 300 through lens assembly 304 must pass through modifier 310 prior to reaching the film (when the shutter opens).

Each modifier 310, 312, is preferably spring biased to its stowed position, as shown in FIG. 29a, and must be mechanically pivoted to its film gate position, shown in FIGS. 29b and 29c. Any appropriate mechanism may be used to pivot either or both modifiers between their stowed and film gate positions, as would be known to those skilled in the art.

In operation, the operator of camera 300 selects a subject for recording on film and then selects if the image should be modified, for example to appear like a painting, and which type of modifier (already installed in camera 300) should be used. If no modifier is to be used, camera 300 may operate in a conventional manner, however, if it is desired to deploy a modifier 310, 312, from its stowed position to the film gate position, an appropriate actuator located on camera 300 may be activated to mechanically or electro-mechanically pivot either (or both) modifier(s) 310, 312 from its stowed position, against the action of the spring bias, to the film gate position. Appropriate electronics and software may be used to automatically return each deployed modifier back to its stowed position after each picture is taken.

Referring to FIGS. 30a–32b, a camera 400, according to another embodiment of the invention includes a body 402, a film gate 404, film 406, a first modifier 408, a second modifier 410, rails 412, and a shutter 414.

This embodiment is similar to the one described above and shown in FIGS. 29a–29c, except that the modifiers here are slidably mounted to body 402, not pivotally mounted as in the earlier embodiment. According to this embodiment, each modifier 408, 410 is slidably mounted to rails 412 that are positioned on opposing sides of film gate 404 and extend to a location within body 402 that is remote from film gate 404. In operation either modifier 408, 410 (or both) may be slidably displaced along rails 412 between a stowed position shown in FIG. 30b, and a film gate position shown in FIGS. 31b and 32b. The modifiers 408, 410 may be moved along rails 412 using any appropriate mechanism. Such a mechanism may be driven using an internal electric motor that is controlled by an on-board processor (not shown) or manually by lever action directed manipulated by the user of camera 400.

Figure 30A:
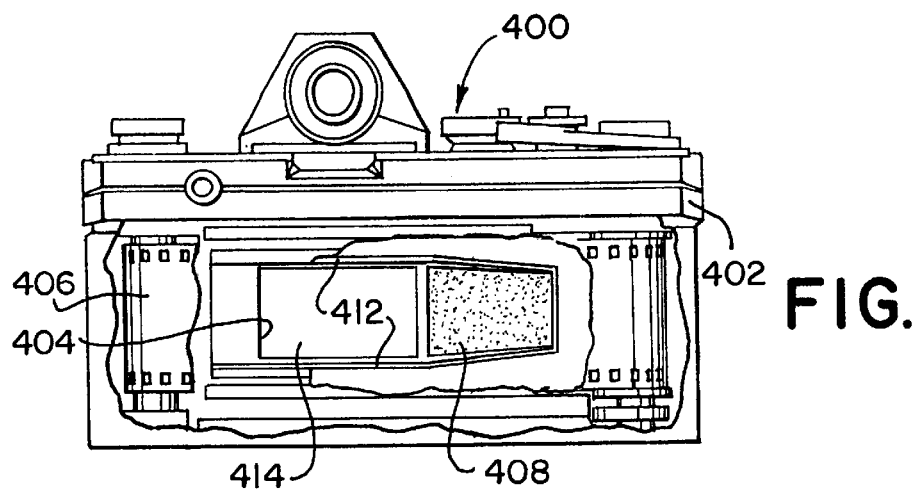
FIG. 30a is a partial sectional rear view of a camera, according to another embodiment of the invention, showing a film gate, film, rails, and a first and second modifiers, located in a stowed position remote from the film gate.
Figure 30B:
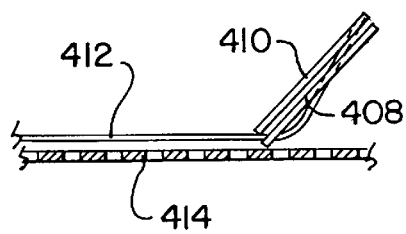
FIG. 30b is a top view schematic of the film gate region of the camera of FIG. 30a, showing the first and second modifiers located in the stowed position, remote from the film gate.
Figure 31A:
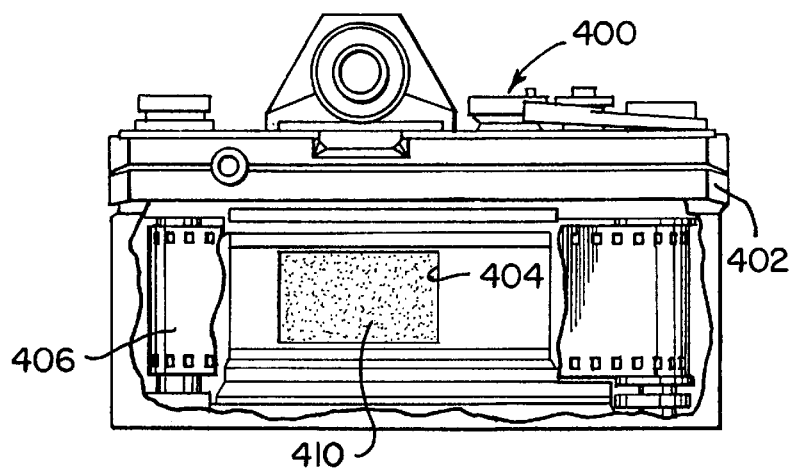
FIG. 31a is a partial sectional rear view of the camera of FIG. 30a, showing the first modifier located within the film gate.
Figure 31B:
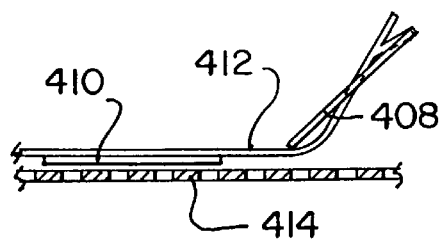
FIG. 31b is a top view schematic of the film gate region of the camera of FIG. 31a, showing the first modifier located in the film gate and the second modifier located in the stowed position.
Figure 32A:
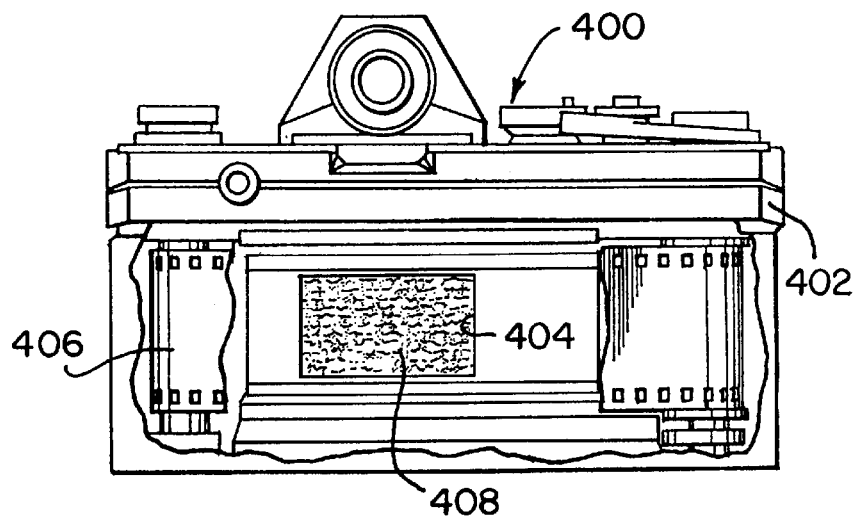
FIG. 32a is a partial sectional rear view of the camera of FIG. 30a, showing the second modifier located within the film gate.
Figure 32B:
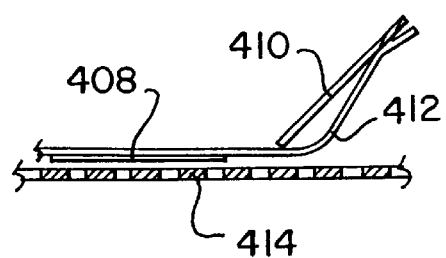
FIG. 32b is a top view schematic of the film gate region of the camera of FIG. 32a, showing the second modifier located within the film gate and the first modifier located in the stowed position, according to the invention.

FIGS. 30a and 30b show both modifiers 408, 410 located in the stowed position so that neither modifier will alter the image light entering camera 400 before reaching film 406. FIGS. 31a and 31b show first modifier 408 located in the film gate position, while second modifier 410 remains in the stowed position so that first modifier 408 will modify the incoming light prior to it reaching film 406. Similarly, FIGS. 32a and 32b show second modifier 410 located in the film gate position, while first modifier 408 is located in the stowed position so that only second modifier 410 will effect the image light prior to it reaching film 406.

This embodiment allows the operator of camera 400 to select a particular modifier (in this case shown in FIGS. 30a through 32b), either first modifier 408 or second modifier 410, prior to releasing the shutter of camera 400, depending on the type of modification desired. For example, as described earlier in this application, first modifier 408 may modify the image light to include impressionistic characteristics and second modifier 208 may modify the image light to include craqueleur characteristics, so that the operator of camera 400 may select either of these modifications, or neither (a normal picture) or both modifiers creating a third different modification. This embodiment may include any number of modifiers 408, 410. Only two modifiers are shown and described for clarity.

In operation of a conventional SLR camera, incoming light from an image passes through a lens assembly and is reflected to an eyepiece using a pivotal mirror and a prism (or a second, stationary mirror), so that the camera operator may view the exact image as seen through the lens. The lens typically includes means for focusing the image and an aperture for controlling the amount of light that enters the camera. When a trigger button on the camera is depressed the pivotal mirror pivots so that a shutter curtain is exposed and light from the lens is allowed to converge at a point located just past the shutter (onto the film located behind the shutter). The shutter then opens at the selected shutter speed, exposing the film to the converged light for a predetermined amount of time.

Referring to FIGS. 33a–33c, a schematic of a single-use single lens reflex (SLR) camera 500 is shown, according to another embodiment of the invention, including a lens assembly 502, a fixed mirror 504, a pivotal mirror 506, a viewing screen 508, an eyepiece 510, a film cassette 512, and a film gate 514. Film cassette 512 and film gate 514 are preferably located in the front of camera 500, above lens assembly 502, as shown in FIGS. 33a–33c, opposite viewing screen 508 and eyepiece 510.

The purpose of this embodiment of the invention is to provide a camera that combines the benefits of an SLR camera with the simplicity and low cost of a single-use camera.

Lens assembly 502 preferably includes a built-in, single-speed shutter similar to the type of lens/shutters used in conventional single-use cameras. Pivotal mirror 506 is pivotally mounted within camera 500 and may be angularly displaced between a viewing position (shown in FIG. 33*a*) and an exposing position (shown in FIG. 33*c*). When pivotal mirror 506 is in the viewing position, image light from the subject enters camera 500 through lens assembly 502 (and shutter, not shown), is projected onto viewing screen 508 by way of fixed mirror 504, and pivotal mirror 506. The image projected onto viewing screen 508 may be viewed through eyepiece 510 in a conventional manner. Film is not exposed to the image light when pivotal mirror 506 is in the viewing position.

When pivotal mirror 506 is in the exposing position, the same image light passing lens assembly 502 and the shutter (not shown) reflects off of fixed mirror 504 and pivotal mirror 506 to film gate 514 and film 512. Image light may not be viewed when pivotal mirror 506 is in the exposing position.

The shutter located within lens assembly 502 may open only pivotal mirror 506 is located either in the viewing position (FIG. 33*a*) or the exposing position (FIG. 33*c*), not when pivotal mirror 506 is moving between the two positions, as shown in FIG. 33*b*.

In operation, initially, the shutter of the camera is biased open and pivotal mirror 506 is in the viewing position so that the operator may see the image of the subject through the lens (similar to a conventional, more expensive, single lens reflex camera). When the operator desires to record a particular image onto film, a button (not shown) is released which closes the shutter thereby blocking image light from entering camera 500, and simultaneously rotates pivotal mirror 506 from the viewing position to the exposing position, as shown in FIG. 33*c*. When pivotal mirror 506 reaches the exposing position, the shutter automatically opens and re-closes (preferably at a set shutter speed) to expose the image onto the frame of film that is located within film gate 514. After the shutter re-closes, pivotal mirror 506 is returned to the viewing position and, again the shutter re-opens to reveal the image light to the operator so that the next picture may be viewed.

Lens assembly 502 focuses the image light either onto viewing screen 508 or the film located within film gate. Therefore, the distance the image light must travel from fixed mirror 504, past pivotal mirror 506, to viewing screen 508 is the same as the distance from the fixed mirror 504, past pivotal mirror 506, to film gate 514.

Pivotal mirror 506 may be rotated using a motor (not shown) or using a pre-wound main spring that has sufficiently rotational energy to operate the pivotal mirror 506 and expose all the film of film cassette 512. Any suitable mechanism may be used to operate the shutter in concert with pivotal mirror 506, as would be known by those skilled in the art.

In an related embodiment of the invention, one or both surfaces of pivotal mirror 506 may include a light modifier, as described earlier in this application, so that the image light is modified, distorted, or otherwise altered prior to being recorded on film. Pivotal mirror 506 may include two or more functional sides, wherein several different types of modifiers may be incorporated and selected.

Figure 34:
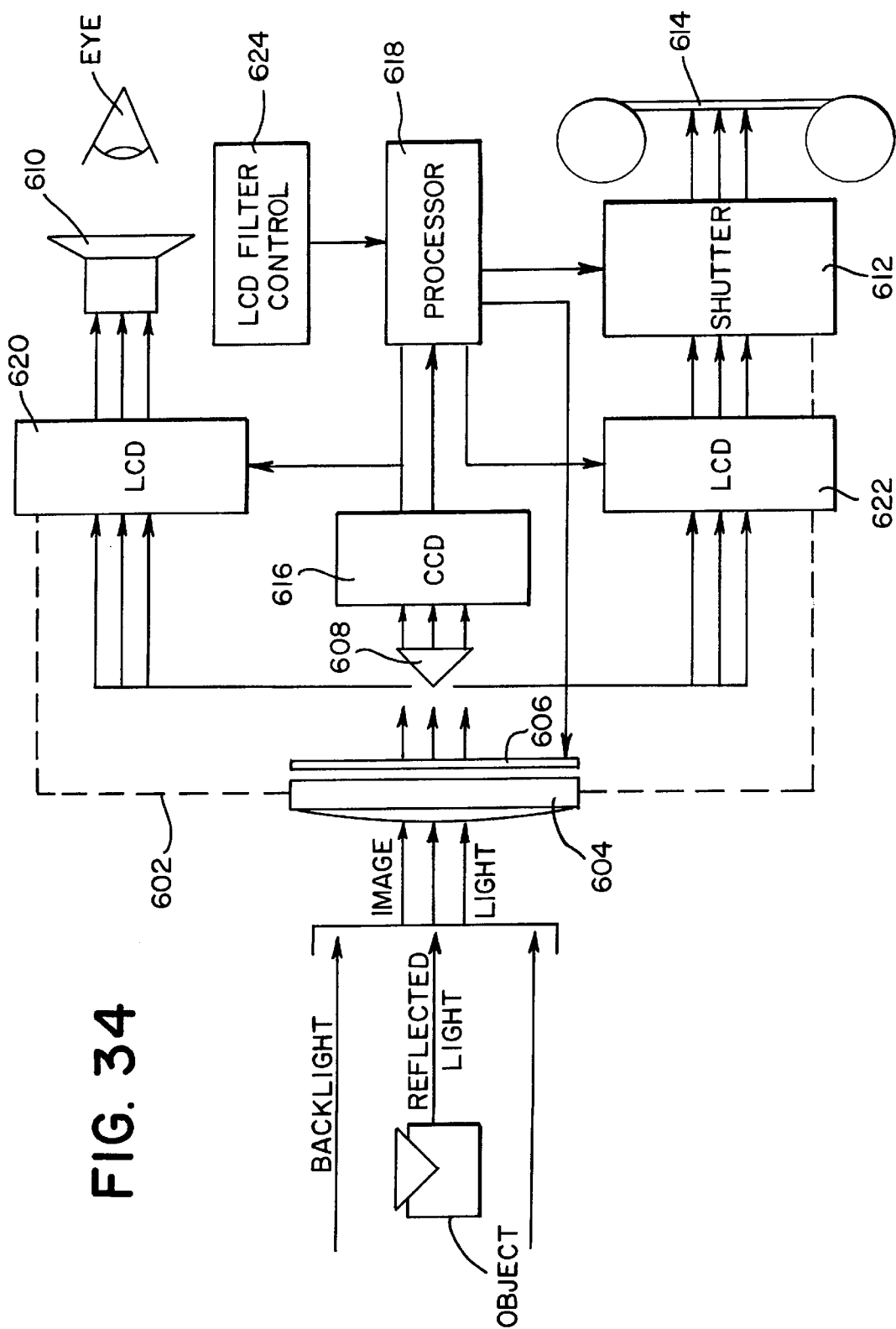
FIG. 34 is a schematic of a camera, according to another embodiment of the invention.

Referring to FIG. 34, a schematic of a single-lens-reflex (SLR) camera 600, according to another embodiment of the invention, is shown including a body 602, a lens assembly 604, an aperture 606, a pivotal mirror and prism assembly 608, an eyepiece 610, a shutter 612 and film 614.

According to the invention, camera 600 includes a multi-segmented light meter 616, a reference liquid crystal display neutral-density filter (LCD-ND) filter 620, and a compensating LCD-ND filter 622

For the purpose of explaining the present invention, as may be appreciated by those skilled in the art, pivotal mirror/prism assembly 608 effectively divides the light rays entering camera 600 through lens 604 (as "image light") into three separate paths, each path receiving all of the image light; a first path is directed to eyepiece 610, through reference LCD-ND filter 620, a second path is directed to multi-segmented light meter 616, and a third path is directed to film 614, through compensating LCD-ND filter 622 and shutter 612.

Multi-segment light meter 616 converts (digitizes) the optical image light it receives into electronic signals similar to the manner in which a charged coupled device (CCD) converts optical information to electrical signals to record an optical image onto video tape. Multi-segment light meter 616 is preferably a CCD type sensor.

Once the image light is converted to electronic signal data, the information is read by a processor 618. The received information includes the intensity (brightness) of each pixel of the image light, as measured by multi-segment light meter 616. Using conventional boundary recognition techniques similar to that which is used by illustrator programs, such as Adobe Illustrator and Photo Workshop, wherein processor 618 uses the information from multi-segment light meter 616 to categorize pixels of multi-segment light meter 616 that have similar contrast levels (or exceed a predetermined intensity level) thereby identifying the group of pixels that represent a foreground object (or objects) against pixels that represent a background image (or images).

Once pixel groups have been formed according to their relative density (or contrast), processor 618 simultaneously sends the information to a reference liquid crystal display neutral density filter (LCD-ND filter) 620 and a compensating liquid crystal display neutral density filter 622. LCD-ND filters 620 and 622 are preferably high resolution clear-plate LCDs and function as light valves (for each pixel). Reference LCD-ND filter 620 is physically positioned in front of eyepiece 610, as described below. Compensating LCD-ND filter 622 is physically positioned in front of shutter 612, as described below.

Processor 618 may selectively control the collective density of each pixel in a selected group so that an entire group of pixels representing a foreground subject, for example, may be made effectively opaque, or uniformly semi-opaque, thereby forming a "mask" that may be used to block specific regions of the image light (corresponding to the "bright" regions of the image) from reaching film 614 (for at least a portion of the exposure time).

A controller 624 is electrically connected to processor 618 and is used to control the density of either a foreground subject, or a background image. This is done simply by controlling the feed voltage to LCD-ND filters 620, 622. Varying the voltage to LCD-ND filters 620, 622, will vary the opacity of each selected pixel of LCD-ND 620, 622. Processor 618 uses the digitized image data to select the pixels of both LCD-ND filters 620, 622. Reference LCD-ND filter 620 is positioned in front of eyepiece 610 so that the image light directed to eyepiece 610 by pivotal mirror/prism assembly 608 must pass through reference LCD-ND filter 620. Selected pixels of LCD-ND filter 620 will cause the image light directed to eyepiece 610 to be selectively masked, according to the digitized image data sent to processor 618. The operator may view the image through eyepiece 610 with a superimposed mask of darkened (selected) pixels of reference LCD-ND filter 620 covering the selected "bright" areas of the image.

Simultaneously, processor 618 controls compensating LCD-ND filter 622 in a similar manner so that the image light that is simultaneously directed, by pivotal mirror/prism assembly 608, to shutter 612 must pass through LCD-ND filter 622. In a similar manner, processor 618 selectively darkens selected regions of compensating LCD-ND filter 622 so that selected regions of film 614 is protected, for a predetermined period of time during exposure of film 614 (when shutter 612 opens).

Processor 618 further controls the operation of shutter 612 and aperture 606 so that processor 618 may control the proper exposure time for the non-masked regions of the image light, in further response to the specific aperture and shutter speed settings controlled by the operator, as understood by those skilled in the art.

Processor may further control and change the relative opacity of any pixel or groups of pixels during the exposure. This includes shifting darkened pixels or pixel groups in rapid succession during the exposure period (shutter open) across the entire "bright" region of the image or simply along a boundary-line of two regions of varying contrast (bright sky next to foreground person). This controlled shifting during the exposure mimics the dodging process used in conventional print processing. By moving the mask, the masking effects may be softened to provide a more realistic exposure correction.

Figure 35A:
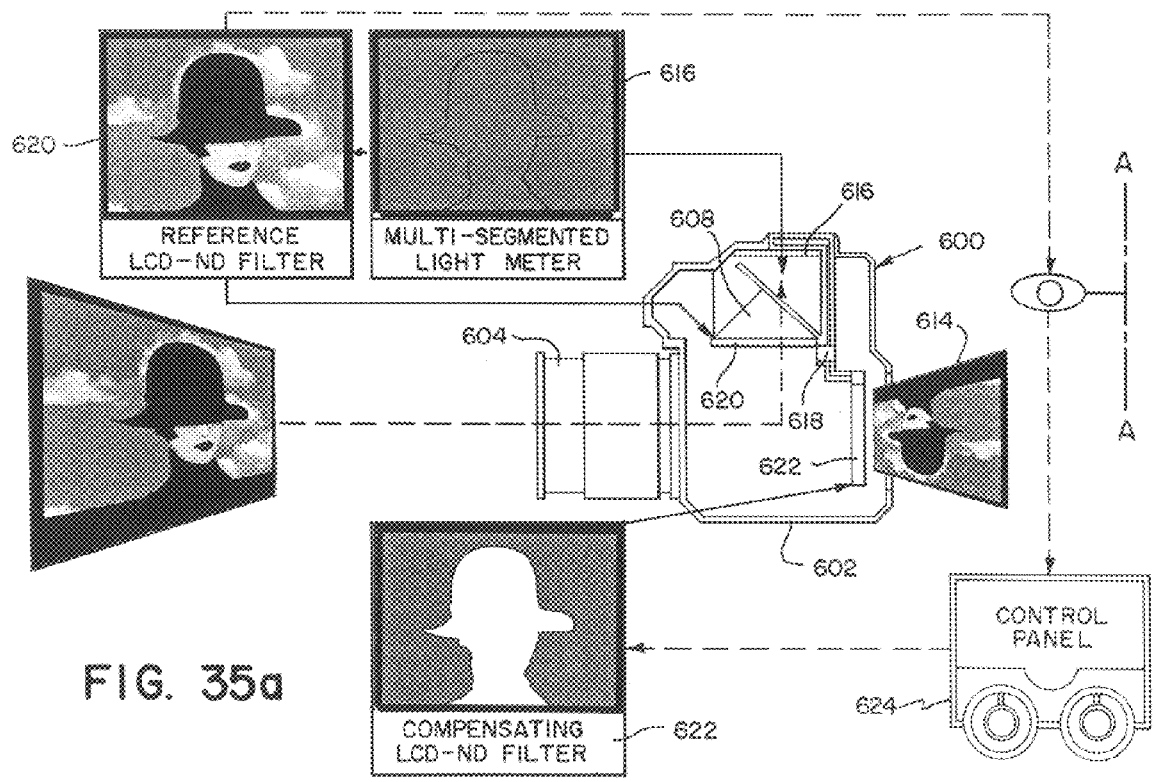
FIGS. 35a, 35b are is an illustrative schematic of the camera of FIG. 34, including a sample image as it is seen by various elements within the camera.
Figure 35:
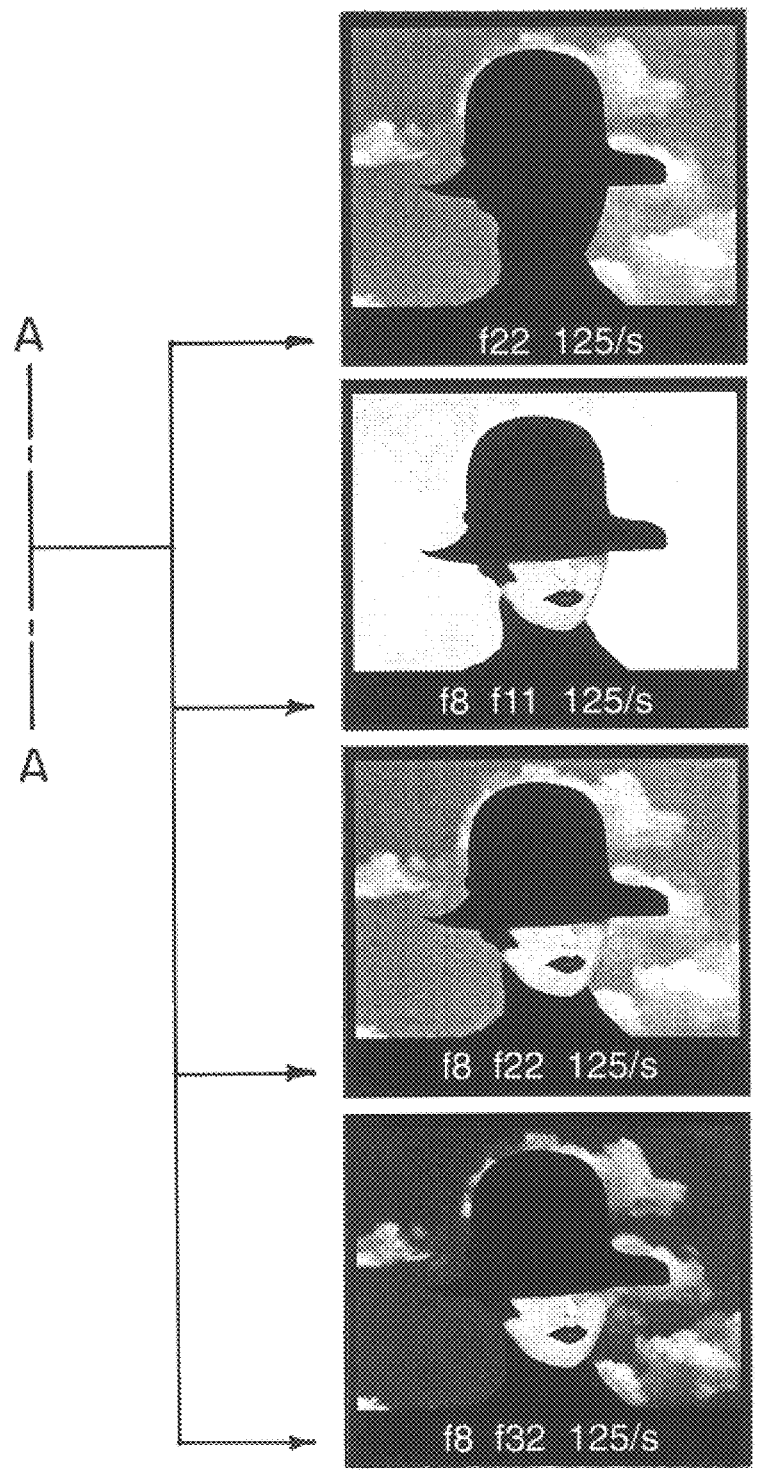

Referring to FIG. 35, camera 600 is shown recording an image onto film 614. The image shown here includes a woman located in the foreground wearing a black hat against a bright partly-cloudy sky. As the image enters camera 600, as described above (see FIG. 34), it is simultaneously sent to multi-segmented light meter 616, reference LCD-ND filter 620, and LCD-ND filter 622. Multi-segmented light meter 616 digitizes the image light it receives and sends pixel-intensity information to processor 618 which in turn categorizes the image into groups of pixels having densities exceeding preset levels. For example, the pixels representing the woman and her hat are considered dark compared to the bright background sky and are therefore grouped together and electronically displayed on both reference LCD-ND filter 620 and compensating LCD-ND filter 622 as transparent, as shown in FIG. 35. This allows processor 618 to expose the relatively dark image of the woman and her hat onto film 614 as if the bright sky was not a consideration in factoring the exposure parameters. Normally, by "metering" off of the dark subject, the resulting exposure would leave a correctly exposed woman/hat subject against a very washed out background sky. The bright sky portion of the image is categorized as a single zone or region and darkened to a predetermined opacity, depending on the relative contrast between the sky and the woman/hat subject. The darkened pixels representing the bright sky portion of the image is mapped out on both LCD-ND filters 620, 622 so that an exact mask of the bright sky portion is displayed in front of eyepiece 610 and, simultaneously, in front of film 614. The end result is a correctly exposed woman/hat subject and a correctly exposed bright sky background simultaneously recorded on the same frame of film 614.

As shown in FIG. 35, controller 624 may be used to vary the level of opacity or transparency of the both the bright and darker zones or regions of the image. For example, the exposure for the bright sky may be varied to create different exposures and therefore different relative contrasts (similar to bracketing techniques used in conventional photography).

FIG. 35 also includes five sample compensation images of varying contrast of both groups (the woman/hat subject and the bright sky background) of the original image, as controlled by controller 624. In operation, the operator of camera 600 may use controller 624 to darken-out the bright regions of the image in real-time, as it is being viewed through eyepiece 610. Similarly, the lighter regions of the image may be selectively darkened using controller 624. When the compensated image appears correct (or otherwise desirable), the image (with the selected compensation) may be recorded on film 614, as described above (see FIG. 34).

Referring to FIG. 36, according to another embodiment of the present invention, two or more modifiers are used to distort or modify image light before it exposes the film of a camera 700. A first modifier 702 is preferably stationary with respect to the film and located within a first plane. A second modifier 704 is selectively movable, preferably within a second plane that is adjacent and parallel to the first plane. Each modifier 702, 704 includes a textured, patterned, roughened, or otherwise distorted surface (either surface or includes internal distorting elements located within the modifier). As second modifier 704 is moved with respect to first modifier 702, the image light from the subject will be continuously distorted in a somewhat unpredictable manner, thereby creating a variety of unusual and unique effects to the image light prior to the light being recorded on film. This variable distorting effect is somewhat similar to the distorting effect experienced when an image is viewed through two layers of screen. In this example, if one screen is moved slightly (depending on the size of the openings), the view image will appear different.

Figure 37:
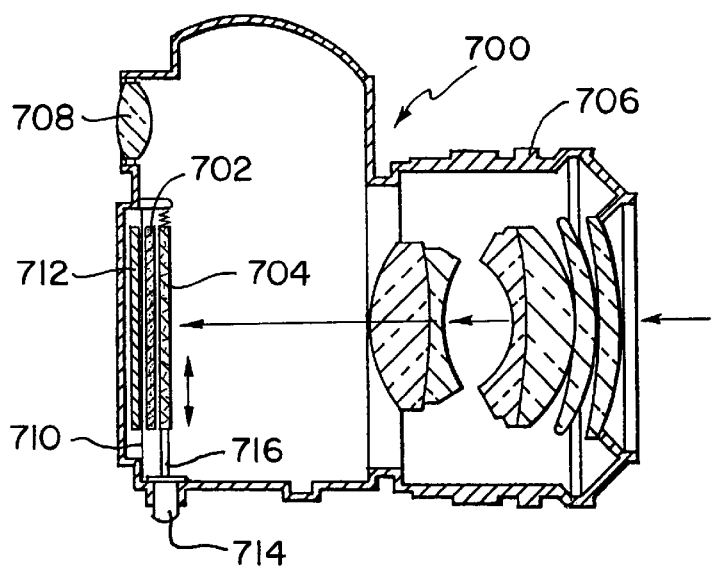
FIG. 37 is a sectional side view of a camera, according to another embodiment of the invention, including the modifier assembly of FIG. 36 located within the camera.

Referring to FIG. 37, a side sectional view of a camera 700 is shown, according to the embodiment of the invention shown in FIG. 36, having first (stationary) modifier 702, second (movable) modifier 704, a lens assembly 706, an eyepiece 708, a film gate 710, and film 712. As light enters camera 700 through lens assembly 706 (represented by an arrow in FIG. 37), it must pass through second modifier 704 and first modifier 702 (and a shutter not shown) prior to exposing film 712 located within film gate 710. Second modifier 704 is mounted to camera 700 in such a manner to allow controlled movement (in this case up and down) with respect to film 712 and first modifier 702. A button 714 is attached to second modifier 704 by arm 716. A spring 718 is attached between second modifier 704 and camera 700 so that button 714 is biased to a rest position.

In operation, after the operator selects a particular subject as viewed through eyepiece 708, he may depress button 714 varying amounts to introduce a different amount of distortion to different images.

Figure 38:
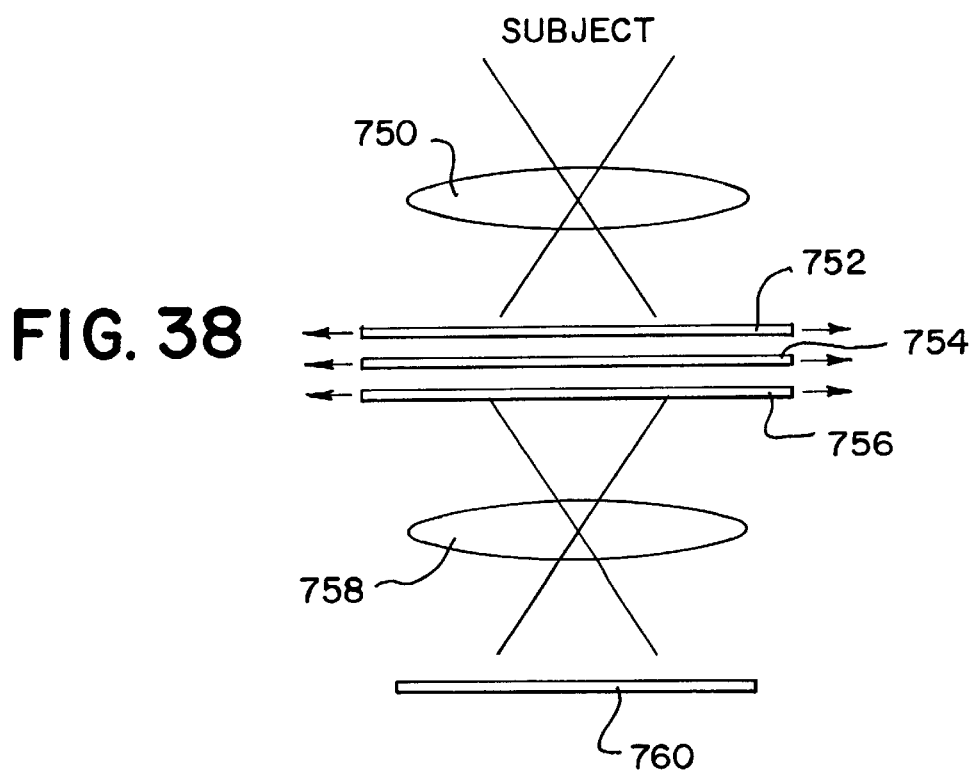
FIG. 38 is a schematic of a modifier assembly, according to another embodiment of the invention, including three different modifiers.

Referring to FIG. 38, a related embodiment of the embodiment shown in FIGS. 36, 37 and described above, is shown including a primary lens 750, a first modifier 752, a second modifier 754, a third modifier 756, a relay lens 758, and film 760 (or digital input device, scanner, digitizer, etc.). In this arrangement, any combination of modifiers 752, 754, 756 may be laterally displaced (each within a plane that is parallel to film 760), a selected amount. Primary lens focuses the image light from the subject to the modifiers 752, 754, 756. Once modified by all three modifiers, the image light is re-focused using relay lens 758 onto film 760. Relay lens 758 is only required if modifiers cannot be positioned adjacent to film 760, as described in earlier embodiments of this invention.

Figure 39A:
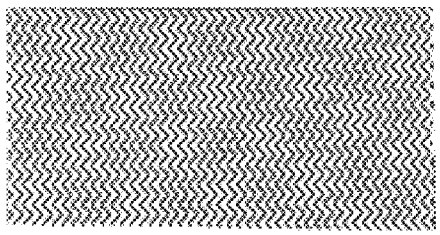
FIGS. 39a–39c are examples of a distortion pattern located on each of the modifiers of FIG. 38, respectively, and according to the invention.
Figure 39B:
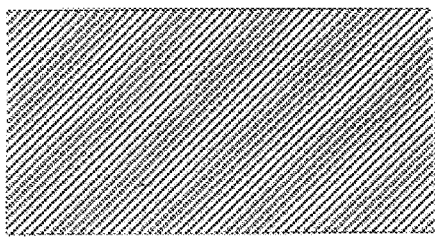
Figure 39C:
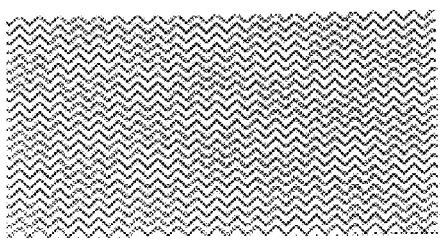

FIGS. 39a, 39b, and 39c are examples of first modifier 752, second modifier 754, and third modifier 756, respectively.

Related variations to the embodiments illustrated in FIGS. 36 and 37 include mounting second modifier 704 to camera 700, in the second plane that is adjacent and parallel to first modifier 702, using elastic elements such as springs so that second modifier 704 may freely move in the second plane in a random manner, as the operator normally holds and operates camera 700.

Furthermore, either (or both) modifier 702, 704 may be mounted in a non-parallel orientation with respect to film 712. Although movement within either the second or first planes is preferred, either (or both) modifiers 702, 704 may be displaced or distorted in any plane, with respect to film 712 to create a variety of image distortions.

Although it is preferred that modifiers 702, 704 be formed from a flat sheet of rigid or semi-rigid transparent material, such as plastic or glass, they may also be formed through an appropriate injection molding process and thereby be shaped curved or bent, or include 3-dimensional surface texture (e.g., a surface relief) to further vary image distortions. Also, either (or both) modifiers 702, 704 may be formed from flexible transparent film (not shown) that is supplied on a roll within camera 700 and includes random or at least different distortions along its length. The film-type modifier (not shown) may be selectively moved past film gate 714 (e.g., rolled up similar to winding conventional film) so that a different distortion pattern or texture may be positioned in front of the yet to be exposed frame of film.

As described above in earlier embodiments, Applicant has discovered that light entering the camera may be modified by placing a modifier within film plane, in front of the film so that the recorded image is artistically distorted and altered, creating an unusual and aesthetically pleasing representation of the image, depending on the modifier used (e.g., an image may be altered to appear like an impressionistic painting of the subject). By selectively moving either modifier 702, 704 with respect to film 714, the sharpness of the modified light reaching the film may be controlled, thereby creating a variety of effects to a single image using a single modifier.

Applicant has further discovered that the sharpness of the light modification may also be controlled by changing the main focus of the lens assembly 706. To accomplish this, with a fixed modifier 702 located adjacent to or within film gate 712, the operator first focuses onto a subject, then deliberately changes the focus a controlled amount (in either direction) within a prescribed range that can be indicated by indicia located on the lens and/or camera (or similarly indicated using an appropriate electronic device). By changing the focus of lens assembly 706 on the subject, the image light entering the camera and representing the subject will be softened, defining the subject's contrast border lines with less sharpness and detail, resulting in a soft image. This "soft" light may be modified by modifier 702 and recorded on film. The degree of focus variation will determine the degree and characteristics of the modification by the modifier.

Alternately, or in conjunction with the focus control, the aperture of the lens may be also be varied to control the variations of modification.

Figure 40:
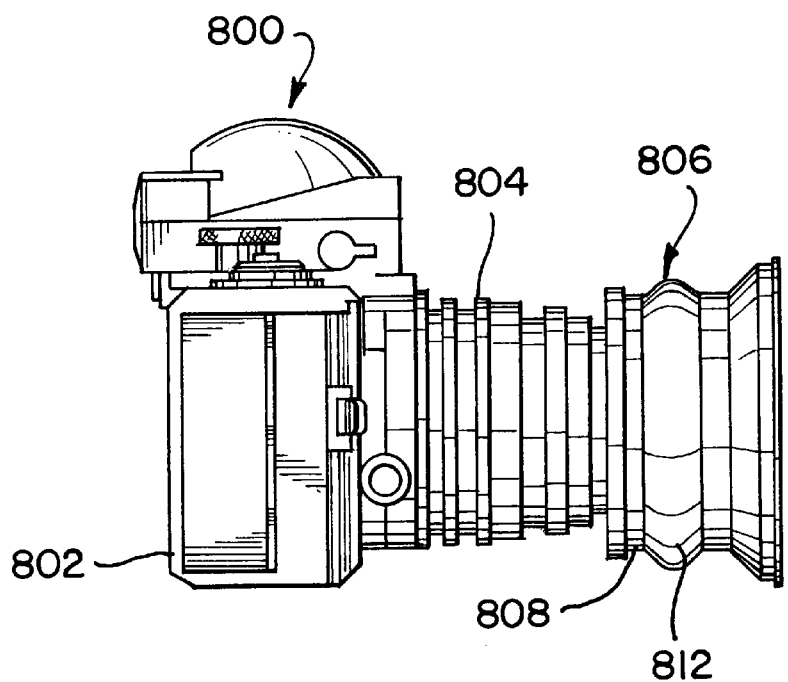
FIG. 40 is a side view of a camera, according to yet another embodiment of the invention, including a lens attachment.
Figure 41:
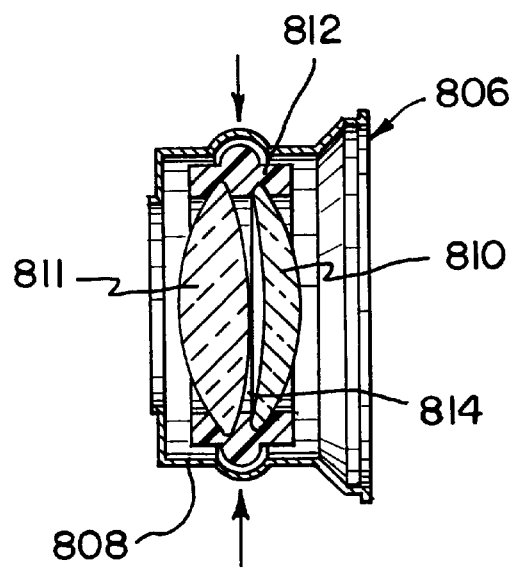
FIG. 41 is a sectional view of the lens attachment of FIG. 40, according to the invention.

Referring to FIGS. 40 and 41, a camera 800, according to another embodiment of the invention is shown, having a body 802 and a lens assembly 804. According to the invention, a lens attachment 806 is mounted to the exposed end of lens assembly 804 so that image light entering lens assembly 804, first passes through lens attachment 806. Lens attachment 806 includes a generally cylindrical housing 808 which supports at least one lens 810 (two are shown in the figure). Lens 810 is elastically mounted to housing 808 by mount 812 so that lens 810 remains in a rest position, but may be manually displaced within housing 808 in a somewhat random manner, by applying an internally directed force to mount 812 along an outer surface of housing 808, as indicated by arrows in FIG. 41.

In operation, as the operator views a particular image (e.g., a baby) through the eyepiece, lens assembly 804, and lens attachment 806 of camera 800, he may squeeze mount 812 (which is accessible on the outer surface of housing 808, so that lens 810 moves from its rest position, depending how mount 812 is squeezed and with how much force. As the operator squeezes mount 812, the image of the subject he views distorts, not unlike the distortion mirrors found at an amusement park.

Mount 812 is preferably ring-shaped made from an appropriate semi-rigid to flexible rubber, such as silicone, and forms part of housing 808, as shown in FIGS. 40 and 41.

Figure 42A:
FIGS. 42a–42c are examples of image distortion using the lens attachment of FIGS. 40–41.
Figure 42B:
Figure 42C:

FIGS. 42a–42c are examples of how the subject (a baby) may be distorted by displacing lens 810 within housing 808. It is preferred that lens 810 returns to the rest position after applied force to mount 812 is removed and that lens 810 does not distort (other than magnify) the image light when at the rest position within housing 808.

Alternately, referring to FIG. 41, lens 810 is positioned adjacent to another lens 811, which together with mount 812, defines an intermediate space 814. Either lens 811 or lens 810 (or both) is made from a semi-rigid plastic (such as the plastic used to make conventional contact lenses to correct myopia). A fluid such as an inert gas, or a transparent liquid is located within intermediate space 814. This fluid is sealed in intermediate space 814 by mount 812 (which is preferably flexible rubber).

In operation of this embodiment as mount 812 is squeezed (or otherwise deformed) by the operators hand, the fluid in intermediate space 814 is forced against both lenses 811 and 810. This force causes either lens (or both) to evenly deform (bulge outward), which subsequently deforms image light entering lens attachment 806.

Although it is preferred to provide lens attachment 806 as an attachment to lens assembly 804, lens attachment 806 may alternately be provided integrally with lens assembly 804.

Although the embodiments thus described relate to modifying image light entering a "still"-type camera prior to the image light exposing film, Applicant further contemplates employing the image light modification for other recording media. For example, after a negative (or transparency) is made, and a print is to be developed, the negative is positioned within an enlarger. A light source projects the image recorded on the negative onto photographic paper or a large CCD (for video recordings, or scanning). According to another aspect of the invention, a modifier may be positioned either directed adjacent to the negative, adjacent to the paper, or at an intermediate position, so that the projected image light is modified, in a manner described above, prior to the light exposing the paper (or downloaded to electronic memory. The modifier may be positioned within a slot located within the enlarger or simply overlaid with the negative within the negative carrier. Also, a modifier, as described above, may be used to distort the image light prior being "recorded" by an electronic scanner and downloaded into a computer. Although certain computer software programs are capable of electronically distorting a stored image, this process is very time consuming. Downloading a pre-modified image into the computer saves time and introduces effects that are not easily attainable using a computer program.

Referring again to FIGS. 36, 37, and 38, described above, a modifier is moved during the exposure of film (i.e., during an open shutter). Referring to the embodiment shown in FIG. 37, modifier 704 is attached to camera 700 using a spring and is mechanically actuated (or moved) during exposure by the camera operator, just before the shutter is released. Similarly, the embodiment of FIG. 36 discloses selectively moving at least one modifier 704 relative to an adjacent modifier 702 (as shown by arrows in FIG. 36). Finally, the arrangement shown in FIG. 38 discloses three separate modifiers 752, 754, and 756, each of which may be selectively moved with respect to the others. The result of moving the modifier or modifiers is to impart additional modification to the recorded image so that a single modifier may provide several effects to the incoming light merely by moving the modifier a controlled amount during exposure.

Figure 43:
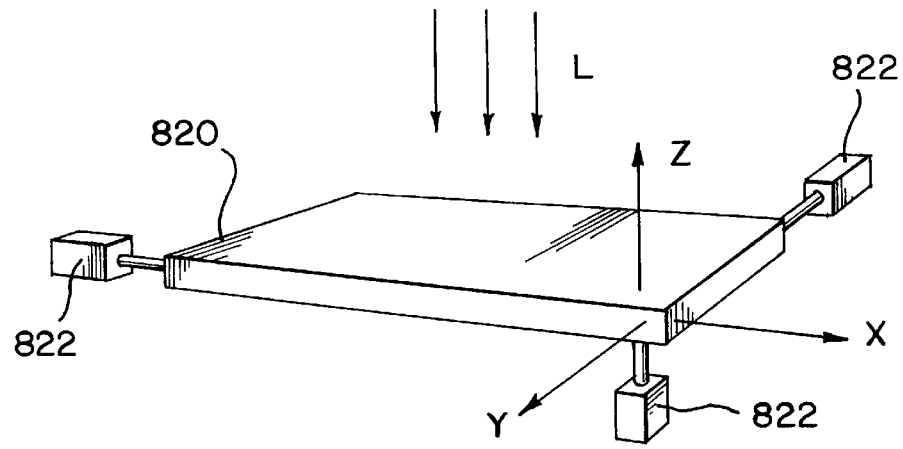
FIG. 43 is a perspective view of a modifier and a vibration generator located along X, Y, and Z axes, according to another embodiment of the invention.

Regardless of the type of movement imparted to these modifiers disclosed in earlier embodiments, the movement of the modifiers occurred within the plane of each respective modifier (e.g., along the X and Y axes, not the Z axis). Referring to FIG. 43, another embodiment of the invention is shown, including a modifier 820 which is positioned within the path of the incoming light (image light entering the camera) and is connected to a vibration generator 822 so that modifier 820 may be selectively moved along an X-axis, a Y-axis, and a Z-axis, wherein the Z-axis is defined as being generally parallel to the incoming light, and the X and Y axes generally define the film (or modifier) plane. By providing controlled movement (e.g., oscillating vibration) with varying components in each of the X, Y, and Z axes (wherein each axis includes a specific vibration rate or frequency and a specific amplitude) during an exposure period, a single modifier 820 may impart any of many different effects to an image, simply by changing the type and magnitude of movement to the modifier.

Vibration generator 822 may be an electromechanical device, such as an electromagnetic vibrator, or may be a piezo-electric crystal. The specific type of vibration generator employed and its specific mounting arrangement and associated linkage to connect with modifier 820 will vary depending on the application and type of modifier, as well as the type of camera being used, as is understood by one skilled in the art.

According to this embodiment, a single modifier 820 may be held stationary during an exposure of an image to create a first effect or modification to that image as it is recorded on the film. Alternately, modifier 820 may be moved at a specific amplitude and rate just along its X-axis (i.e., 100% X-axis, 0% Y-axis, and 0% Z-axis) to impart a second effect to the image. The amplitude of movement or the rate (i.e., frequency) can be altered, again just along the X-axis to provide many more effects still using the same modifier in the path of the incoming light. In another example, vibration generator 822 can be manipulated so that modifier 820 is moved along the X axis (at a certain amplitude and rate) and along the Y axes (at a second amplitude and rate), and perhaps also along the Z axis (at a third amplitude and rate). Each rate and each amplitude along each axes may be independently varied to generate one of many effects imparted by a single modifier.

According to yet another embodiment of the invention, specific paintings from known artists are scanned using a laser-scanner and the resulting scanned data is fed to a computer. As understood by those skilled in the art of image analysis, the brush-stroke components of each scanned painting may be extracted from the scanned data to establish a specific brush-stroke pattern or style, indicative of the particular artist. For example, a Monet painting from a specific impressionism period may be scanned to determine his style at that time included brush-strokes having a distinctive short length, ending with a slightly upward curve. This "signature" data may then be used to create a modifier that mimics or replicates the style of a particular painter, such as Monet, to photography so that a photographer may modify an image so that the recorded image appears like a Monet painting, for example. In this embodiment, the modifier may be stationary, or may move, as described in earlier embodiments. In the latter case, such movement may be carefully controlled in a pre-set manner to replicate the "brush-strokes" of any particular painter using a single modifier. Following the above Monet example, a modifier could be moved along the X and Y axes so that the incoming light is "smeared" onto the film, during exposure, in a slightly curved and upward direction. The resulting photograph of water lilies, for example, ends up looking like it was painted by Monet himself. The styles of other painters could simply be "dialed-in" by the photographer to alter the modifier movement accordingly, and the resulting effect on the recorded image.

It is preferred that vibration generator 822 be controlled in response to certain parameters and settings of the camera and film, including the speed of the film, the particular shutter speed and aperture setting, whether a flash is being used, the type of lens and its focal length. Most cameras manufactured today include an on-board computer which receives most of the above-listed parameters to determine the correct exposure for each picture taken. Applicant contemplates vibration generator 822 to be controlled by the on-board computer following prescribed software, as understood by those skilled in the art. The software would control the specific movement of the modifier according to the type of modification desired by the user, as described above. The movement of the modifier may create different effects depending on the other exposure parameters. For example, a relatively slow shutter speed may cause greater "smearing" and a "softer" modification to an image by movement from the modifier, whereas a quicker shutter speed would create a sharper modification to the image by similar movement by the same modifier.

Figure 44:
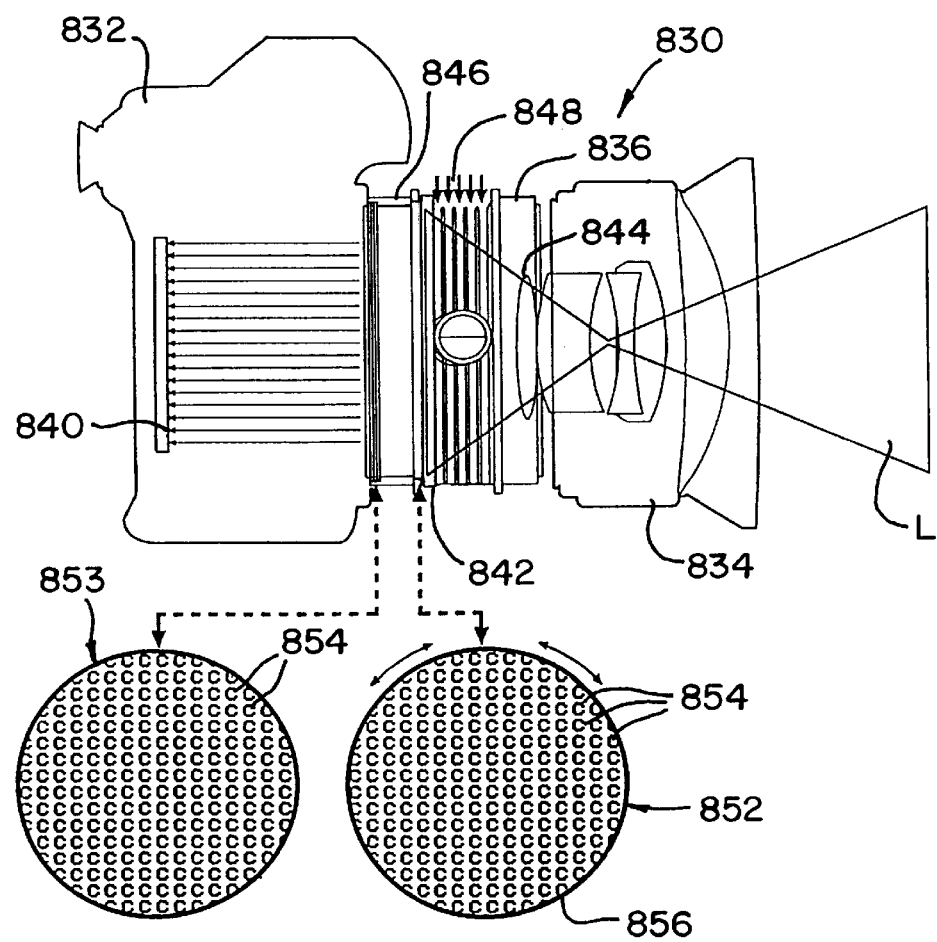
FIG. 44 is a sectional side view of a camera including a modifier coupler, showing details of a relay lens assembly, according to another embodiment of the invention.
Figure 45:
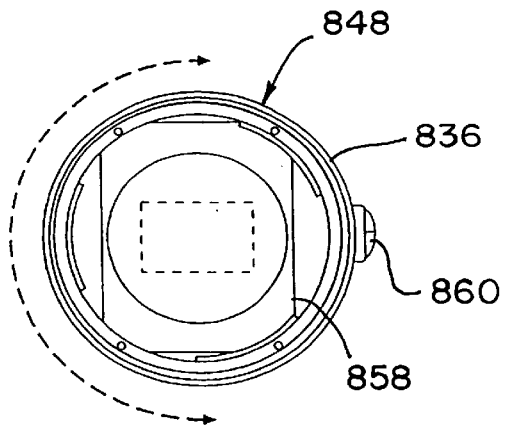
FIG. 45 is a rear view of the modifier coupler shown in FIG. 44, according to the invention.

Referring to FIGS. 44 and 45, a camera 830, according to another embodiment of the invention is shown which is similar to the above-described embodiment shown in FIGS. 13–15, described above. Camera 830 includes a body 832, a conventional lens 834 and a modifier coupler 836. Modifier coupler 836 couples conventional lens 834 to body 832 and passes incoming light L from conventional lens 834 to a film 840 in body 832. Modifier coupler 836 includes an image plane 842, a primary lens assembly 844 located between image plane 842 and conventional lens 834 (and may include the lens of conventional lens 834), a secondary lens assembly 846 which is located between image plane 842 and film 840, and at least one modifier receiving slot 848. As described in the embodiment shown in FIGS. 13–15, incoming light from a subject is focused onto image plane 842 using conventional lens 834 and primary lens assembly 844. Modifier receiving slot 848 is preferably located at (or adjacent to) image plane 842 so that the incoming light L conveying an image may be modified when it is in focus at image plane 842. Image plane 842 may include a frosted image screen (not shown). Once modified, the image light is refocused onto film 840 using secondary lens assembly 846. According to this embodiment of the invention, secondary lens assembly 846 is preferably made using a coupled pair of monolithic lenslet modules (MLMs) functioning as a relay lens.

As shown in FIG. 44, MLMs are arrays of refractive micro lenses which are usually made from optical epoxies or optical plastics. As a relay lens, a first lenslet module 852 is coupled with a similar second module 853, mounted parallel and adjacent to each other, according to their optical characteristics and the desired optical correction. Each module 852, 853 includes an array of micro lenses 854 and is positioned a predetermined distance from the other so that image light at image plane 842 may be brought into focus at film 840. Each micro lens 854 of a first (front) lenslet module 852 functions to refract just a portion of the image light located at image plane 842 to a corresponding micro lens 854 located on the adjacent (rear) lenslet module 853, which then corrects the refracted image light and refocuses the image light to film 840.

Use of such monolithic lenslet modules as general relay lenses is known by those skilled in the art. These lenslet modules are commercially available from Adaptive Optics Associates, Inc. of Cambridge, Mass. Some of the benefits of using lenslet modules as relay lenses for secondary lens assembly 846 instead of using conventional lenses include a reduction in weight and length of modifier coupler 836. Furthermore, since each lenslet module 852 is made up of an array of micro lenses 854, than additional effects to an image located at image plane 842 made be created by displacing the micro lenses of first lenslet module 852 relative to second module 853. To achieve this, it is preferred that one lenslet module 853, for example, is fixedly mounted within modifier coupler 836, while the other lenslet module, 852, (in this example) is mounted to a rotatable frame 856 which may be selectively angularly displaced within modifier coupler 836 to create different effects to the image light located at image plane 842.

Figure 45A:
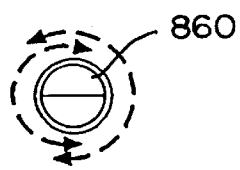
FIG. 45a is a plan view of an actuator that allows rotational movement of modifiers positioned within modifier coupler of FIG. 44, according to the invention.
Figure 47A:
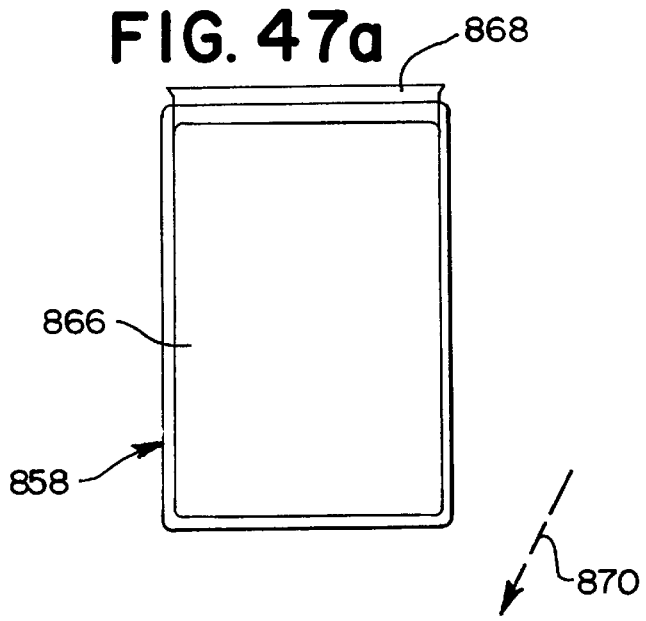
FIG. 47a is a front view of a prism modifier, according to another embodiment of the invention.
Figure 47B:
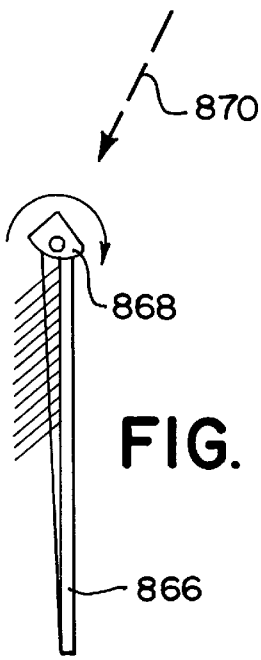
FIGS. 47b–c are side views of the prism modifier of FIG. 47a showing operational details, according to the invention.
Figure 47C:
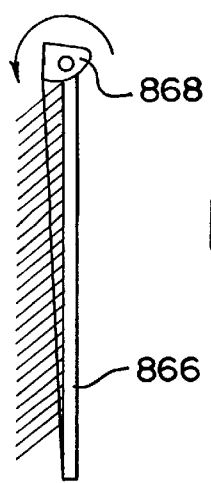

FIG. 45 is a rear view of modifier coupler 836, according to this embodiment of the invention, as shown in FIG. 45, modifier-receiving slot 848 may be selectively angularly displaced (rotated about the longitudinal axis of the lens) to change the relative orientation of an inserted modifier 858 with respect to the subject. As shown in FIGS. 45 and 45a, an actuator 860 is used to selectively rotate and further lock modifier receiving slot 848 with respect to modifier coupler 836 as desired by the user. According to another embodiment of the invention, if more than one modifier-receiving slot 848 is provided within modifier coupler 836, each slot 848 may be selectively rotatable in a similar manner, with respect to each other and modifier coupler 836.

Figure 46A:
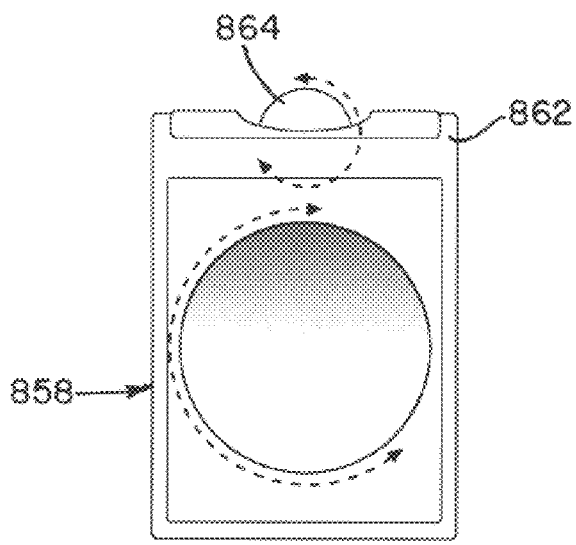
FIGS. 46a–e is a front view of exemplary modifiers, according to the invention.

According to this embodiment of the invention, referring to FIGS. 46a–e, individual modifiers 858 are shown. Each modifier 858 is preferably mounted within a frame 862 which is sized and shaped to fit within modifier-receiving slot 848, as desired. Additional modifier-receiving slots 848 may be provided to accommodate combinations of modifiers 858. FIG. 46a shows a neutral density standard filter that is rotatably mounted within frame 862 and includes a control actuator 864 that remains accessible to a user after this modifier is inserted into modifier-receiving slot 848. Actuator 864 selectively rotates the filter with respect to incoming image light.

Figure 46B:
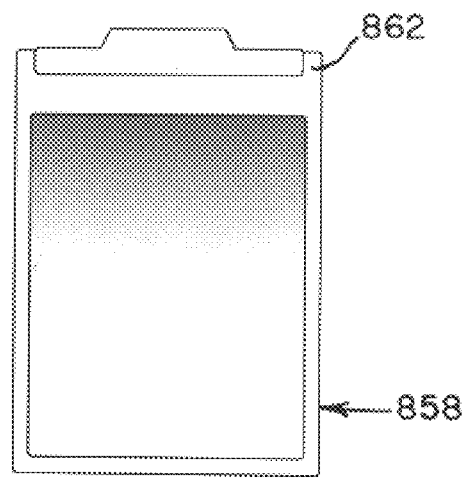

FIG. 46b shows a neutral density gradient type filter mounted within frame 864, according to this embodiment of the invention.

Figure 46C:
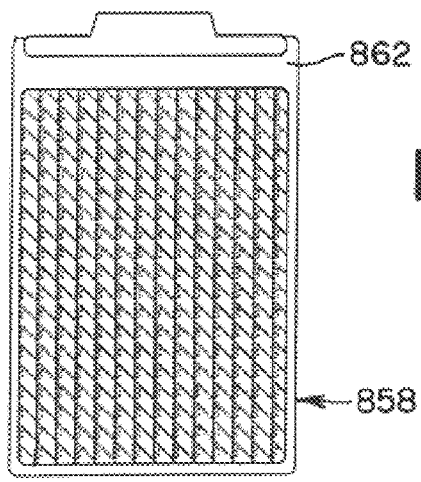

FIG. 46c shows a modifier 858 that produces an optical "tile" effect to image light.

Figure 46D:
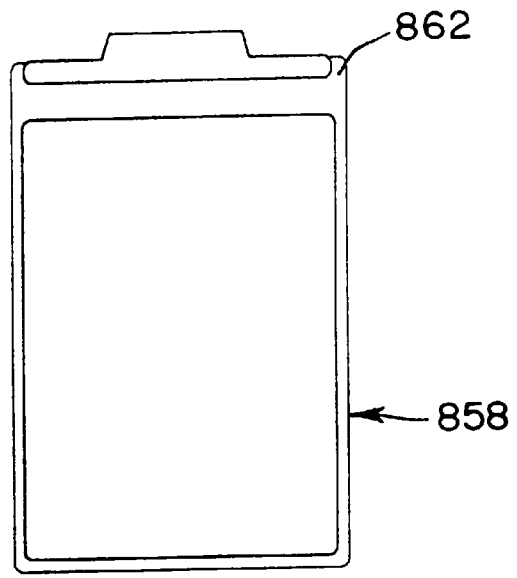
Figure 46E:
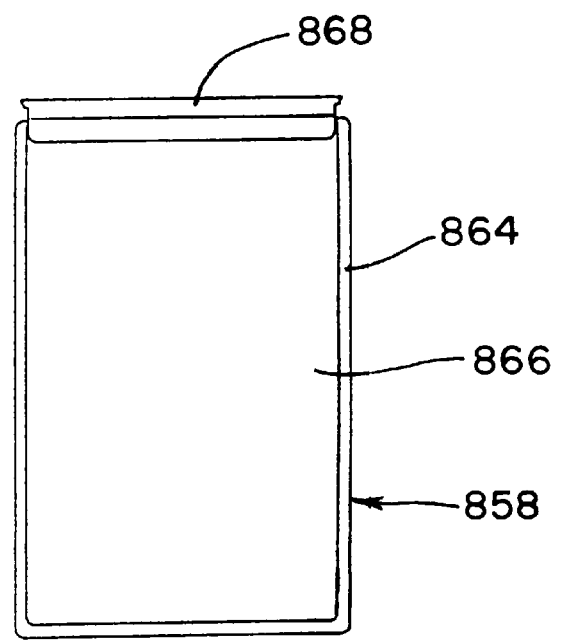
Figure 48:
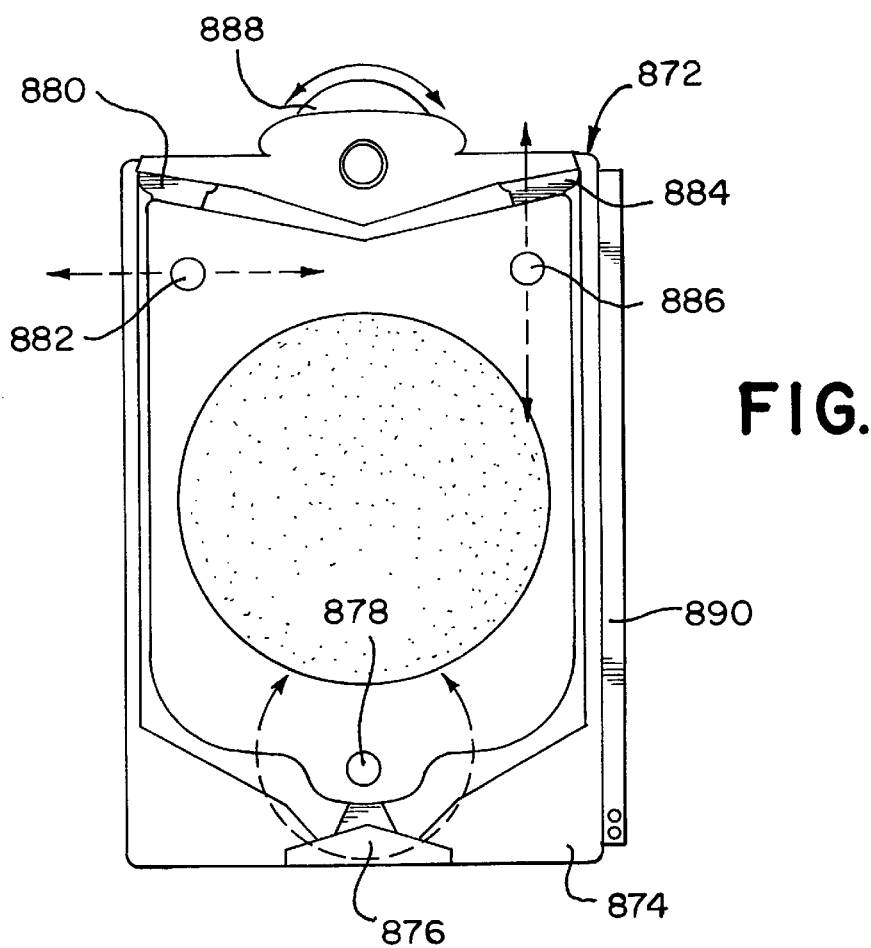
FIG. 48 is a front view of a displaceable modifier cartridge, showing vibration generators, and an inserted modifier, according to another embodiment of the invention.
Figure 49A:
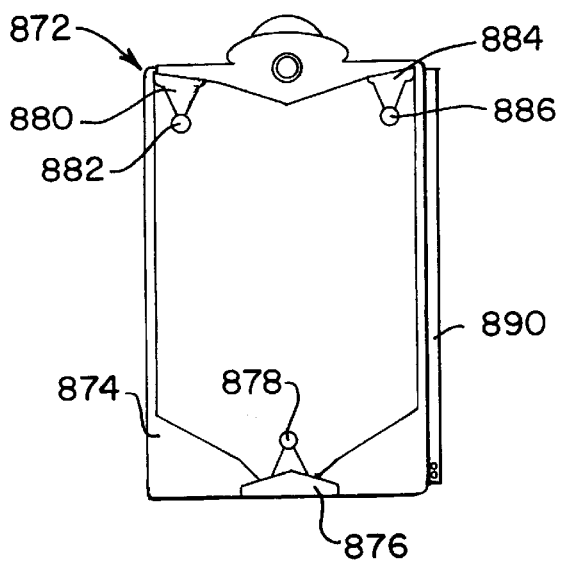
FIG. 49a is a front view of the displaceable modifier cartridge, shown empty (no inserted modifier), according to the invention.
Figure 49B:
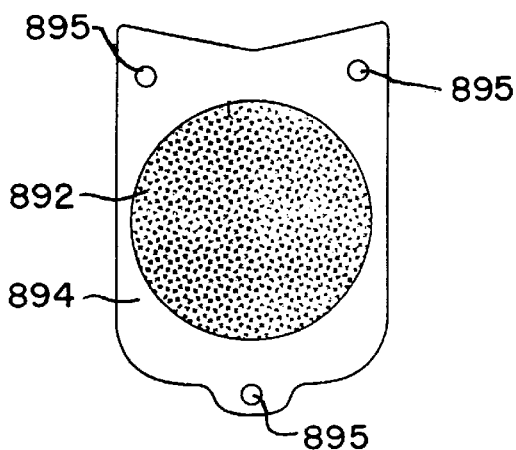
FIGS. 49b–e are front views of exemplary modifiers, according to the invention; and, FIGS. 50a–f are illustrative side views of a modifier coupler, according to another embodiment of the invention, showing a tiltable primary lens assembly and a tiltable modifier.
Figure 49C:
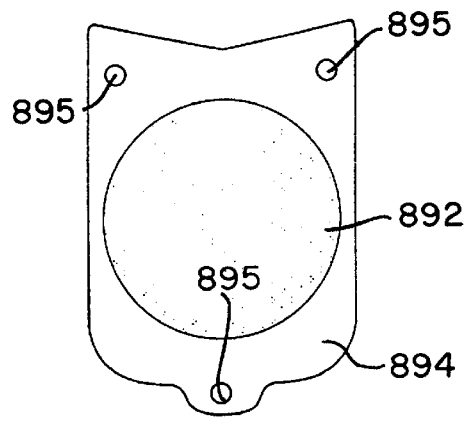
Figure 49D:
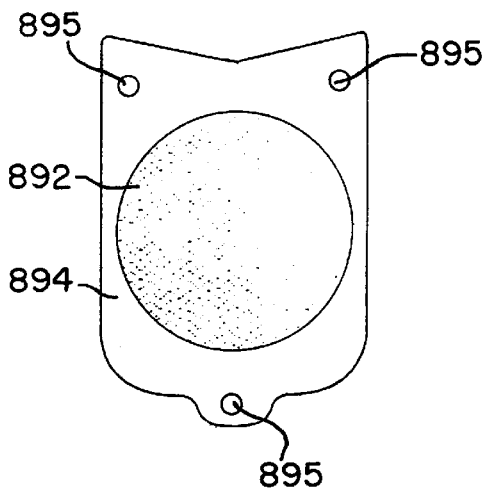
Figure 49E:
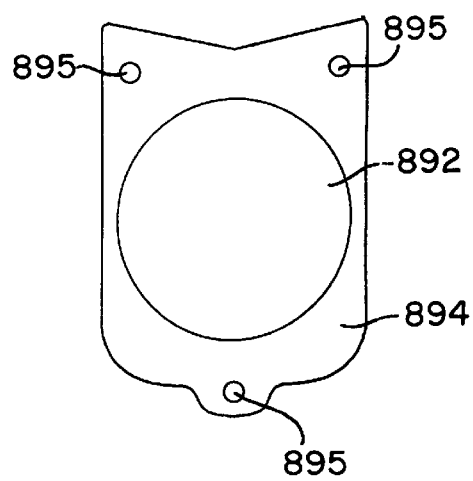

FIG. 46d shows a modifier 858 that functions as an LCD-ND, in a similar manner to an earlier described embodiment (see FIGS. 34, 35a, and 35b, and the corresponding description) wherein the exposure of selective portions of an image may be corrected independent of the remaining portions of the image. Such an LCD-ND modifier 858 includes appropriate electrical connections (not shown) which are adapted to provide electrical communication between camera 830 and LCD-ND modifier 858.

FIGS. 46e, 47a–c, show a prism modifier 858 which includes a transparent or translucent plate 866 mounted within frame 864 and a pivotal prism 868 mounted to a top portion of frame 864. Prism 868 is adapted to receive ambient light 870 and selectively project the ambient light within modifier coupler 836 against plate 866 resulting in a softening "fog" effect to any image located at image plane 842.

Other modifying effects include providing grain to the image similar to film-emulsion grain, providing surface texture to an image, providing conventional color filtration, providing polarizing filtration, and conventional special effects.

According to another embodiment of the invention, referring to FIGS. 48, and 49a–e, a displaceable modifier cartridge 872 is shown including a cartridge frame 874, a first vibration generator 876 connected to a first mount 878, a second vibration generator 880 connected to a second mount 882 and a third vibration generator 884 connected to a third mount 886. Each vibration generator 876, 880, and 884 are preferably independently controllable through an accessible control knob 888 located on frame 874, and powered by a power strip 890 that provides electrical communication with modifier coupler 836 when modifier 872 is inserted within slot 848. A variety of modifiers 892 are provided, each mounted within a modifier frame 894. Each modifier frame 894 includes mounts 895 which are sized and shaped to be mounted to modifier cartridge 872 at first, second, and third mounts, 878, 882, and 886, respectively. Once a desired modifier 892, mounted within frame 894 mounted to the mounts of modifier cartridge 872, cartridge 872 may then be inserted within slot 848 of modifier coupler 836 (see FIG. 44), at which point power strip 890 will electrically engage with a mating connector (not shown), located within modifier coupler 836. Once inserted within modifier coupler 836, the user may selectively control any of the three vibration generators 876, 880, and 884 to impart a unique vibrational movement to the mounted modifier 892. As described in earlier embodiments, such movement can create a multitude of new effects to the image located at image plane 842 of modifier coupler 836.

Although three vibration generators 876, 880, and 884 are preferred, two or one generator may be used. Regardless of how many vibration generators are used, the vibration to modifier 892 may be controlled either by the photographer, using knob 888, or by internal circuitry of camera 830, whereby the photographer may select a desired effect (e.g., impressionism painting) on the camera and have the camera control the necessary movement (during exposure) to create the desired effect. Different types of modifiers 892, shown in FIGS. 49b–e may be used with the displaceable modifier cartridge 872, according to the invention. These modifiers include different light-modifying characteristics that create many different effects when moved in various ways.

Referring to FIGS. 50a–f, a modifier coupler 900, according to yet another embodiment of the invention is shown including a primary (forward) lens assembly 902, an intermediate focal plane 906, a modifier 908, and a relay lens assembly 910. Similar to earlier embodiments, described above, and referring to FIGS. 50*a–b*, primary lens assembly 902 focuses incoming image light onto an intermediate focal plane or image screen 904, either through a modifier 908, as in FIG. 50*a*, or not, as in FIG. 50*b*, and onto film using a relay lens assembly 910.

Figure 50A:
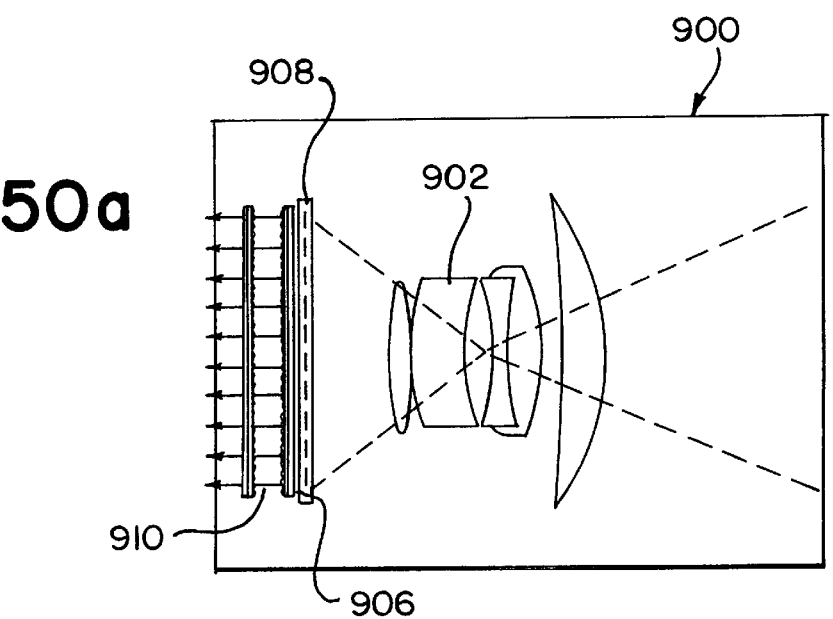
Figure 50B:
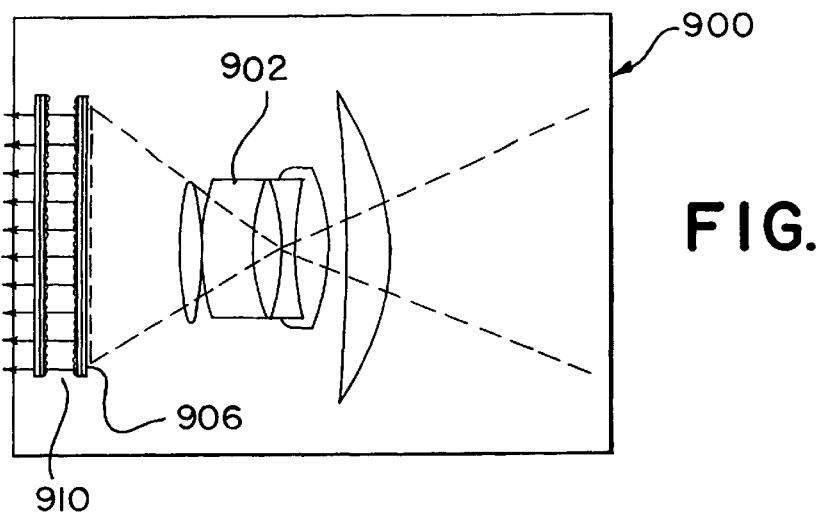
Figure 50C:
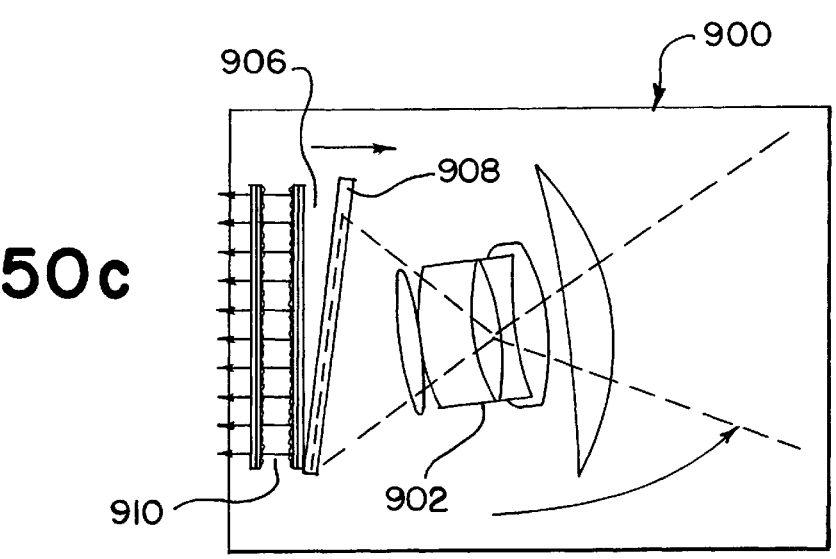
Figure 50D:
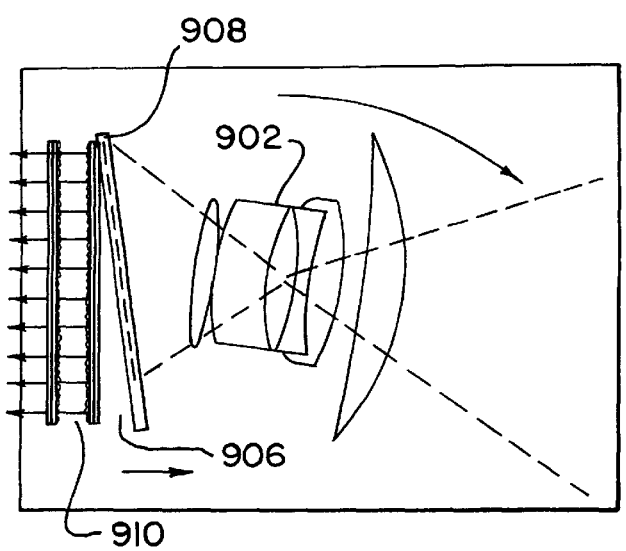
Figure 50E:
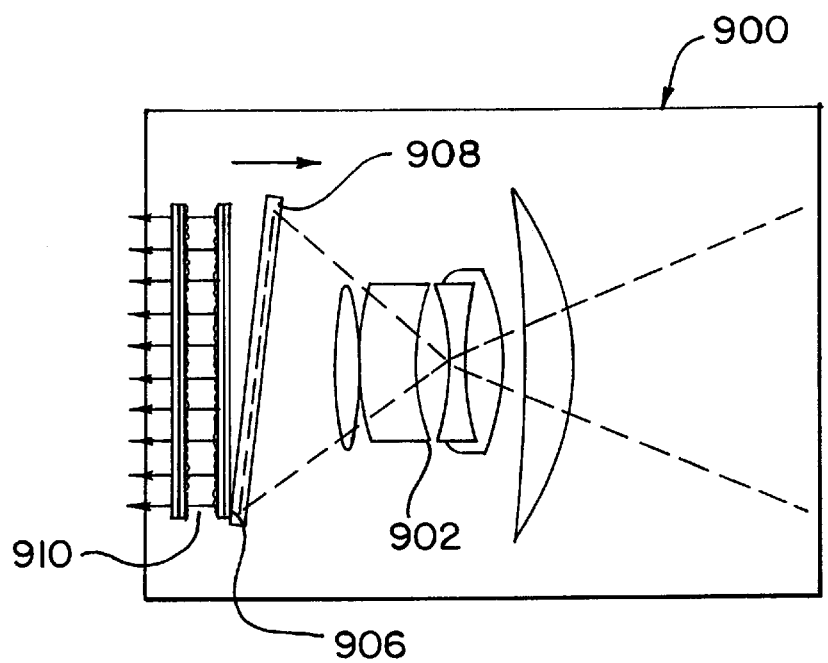
Figure 50F:
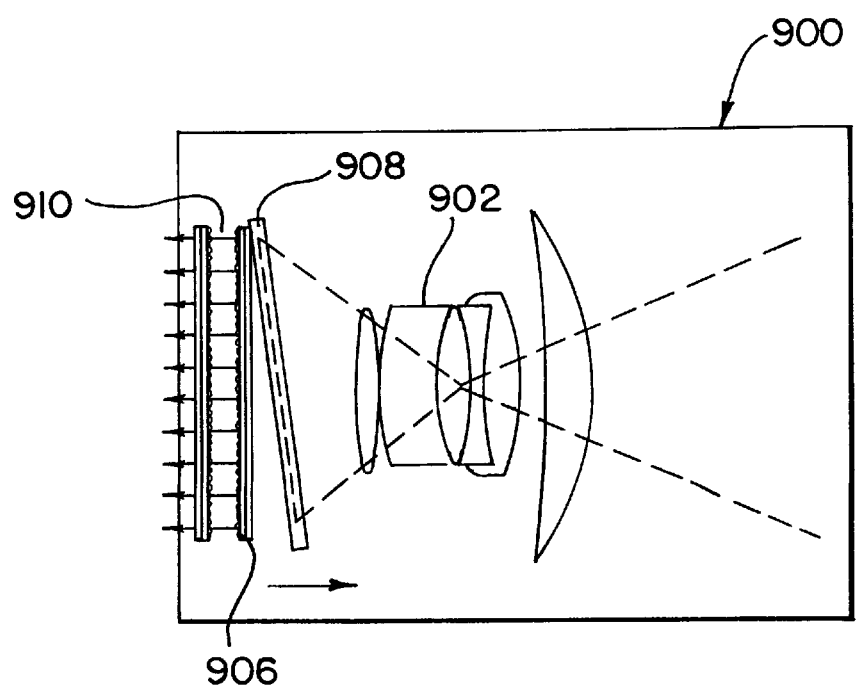

According to this embodiment of the invention, primary lens assembly 902 is pivotally mounted within modifier coupler 900 so that the entire lens assembly may be selectively pivoted with respect to the longitudinal axis of the modifier coupler 900, as shown in FIGS. 50*c* and 50*d*. Also, modifier 908 is pivotally mounted within modifier coupler 900 so that any selected modifier inserted within modifier couple may be selectively pivoted with respect to the longitudinal axis of modifier coupler 900, as shown in FIGS. 50*c–f*. Such pivotal movement of either primary lens assembly 902 or modifier 908, or both, allow selected portions of an image (e.g., an upper portion or a side portion) to be modified without effecting the entire image. As an example, a modifier may be used to soften just half of a subject's face while leaving the opposite half sharp to create a dramatic portrait. By providing pivotal movement of both the modifier and the primary lens assembly, a photographer is provided with an even greater number of effects.

What is claimed is:

1. A camera, comprising:
   a body having a front and a rear;
   a film plane located adjacent said rear of said body;
   an intermediate focal plane located a predetermined distance in front of said film plane;
   a first lens located in front of said intermediate focal plane, said first lens adapted to focus light from an image onto said intermediate focal plane;
   a transparent optical modifier located at said intermediate focal plane, said modifier adapted to selectively modify at least a portion of said light from said image, said modifier being pivotally mounted with respect to said intermediate focal plane;
   means for selectively pivoting said modifier so that select portions of said modifier become displaced from said intermediate focal plane; and
   a second lens located between said intermediate focal plane and said film plane, said second lens adapted to focus said modified image onto said film plane.

2. The camera according to claim 1, further comprising means for pivotally mounting said first lens with respect to said intermediate focal plane.

3. The camera according to claim 1, wherein said second lens includes a first planar array of micro lenses and second planar array of micro lenses, said first and second planar arrays being selectively rotatable with respect to each other.

4. An attachment for use with a camera for altering the light of an image prior to said image being recorded onto film, said camera having a lens aperture, a frame of film located at a film plane, and a lens, said attachment comprising:
   an intermediate focal planar located a predetermined distance from said film plane between said film plane and said image when said attachment is attached to said camera;
   means for focusing said light of said image onto said intermediate focal plane;
   a transparent optical modifier located at said intermediate focal plane, said modifier adapted to selectively modify at least a portion of said light from said image, said modifier being pivotally mounted with respect to said intermediate focal plane;
   means for selectively pivoting said modifier so that select portions of said modifier become displaced from said intermediate focal plane; and
   a second lens located between said intermediate focal plane and said film plane, said second lens adapted to focus said modified image onto said film plane when said attachment is attached to said camera.

5. The attachment, according to claim 4, further comprising means for pivotally mounting said first lens with respect to said intermediate focal plane.

6. An attachment for use with a camera for altering the light of an image prior to said image being recorded onto film, said camera having a lens aperture, a frame of film located at a film plane, and a lens, said attachment comprising:
   an intermediate focal plane located a predetermined distance from said film plane between said film plane and said image when said attachment is attached to said camera;
   means for focusing said light of said image onto said intermediate focal plane;
   a transparent optical modifier located at said intermediate focal plane, said modifier adapted to selectively modify at least a portion of said light from said image; and
   a second lens located between said intermediate focal plane and said film plane, said second lens adapted to focus said modified image onto said film plane when said attachment is attached to said camera said secondary lens includes a first planar array of micro lenses and second planar array of micro lenses, said first and second planar micro-lens arrays being selectively rotatable with respect to each other.

7. The camera according to claim 6 wherein said second lens includes a first planar array of micro lenses and second planar array of micro lenses, said first and second planar arrays being selectively rotatable with respect to each other.

* * * * *